US011134134B2

(12) United States Patent
Uppal et al.

(10) Patent No.: US 11,134,134 B2
(45) Date of Patent: *Sep. 28, 2021

(54) ROUTING FOR ORIGIN-FACING POINTS OF PRESENCE

(71) Applicant: Amazon Technologies, Inc., Seattle, WA (US)

(72) Inventors: Hardeep Singh Uppal, Seattle, WA (US); Matthew Graham Baldwin, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,012

(22) Filed: Mar. 21, 2019

(65) Prior Publication Data

US 2019/0222666 A1 Jul. 18, 2019

Related U.S. Application Data

(63) Continuation of application No. 14/937,762, filed on Nov. 10, 2015, now Pat. No. 10,270,878.

(51) Int. Cl.
*H04L 29/08* (2006.01)
*H04L 12/751* (2013.01)
(Continued)

(52) U.S. Cl.
CPC .......... *H04L 67/2847* (2013.01); *H04L 45/02* (2013.01); *H04L 45/126* (2013.01);
(Continued)

(58) Field of Classification Search
CPC . H04L 67/2846; H04L 67/18; H04L 67/2842; H04L 67/327; H04L 67/42; H04L 45/02; H04L 45/126
See application file for complete search history.

(56) References Cited

U.S. PATENT DOCUMENTS 1,075,551 A 10/1913 D'Amours
5,063,500 A 11/1991 Shorter
(Continued)

FOREIGN PATENT DOCUMENTS

CA 2741 895 A1 5/2010
CA 2765397 A1 2/2011
(Continued)

OTHER PUBLICATIONS

"Non-Final Office Action dated Jan. 3, 2012," U.S. Appl. No. 12/652,541; dated Jan. 3, 2012; 35 pages.
(Continued)

*Primary Examiner* — Blake J Rubin
(74) *Attorney, Agent, or Firm* — Knobbe, Martens, Olson & Bear, LLP

(57) ABSTRACT

Systems and methods are described to enable and manage the use of origin-facing points of presence ("POPs") within a content delivery network ("CDN"). Origin-facing POPs can provide a second-tier caching mechanisms in a CDN, such that cache misses occurring at first-tier POPs may be processed by using information maintained at the origin-facing POPs, rather than requiring interaction with an origin server. Associations between origin-facing POPs and origin servers may be automatically created based on a distance between the respective origin-facing POPs and origin servers, such that an operator of the origin server is not required to specify a location of an origin facing POP. First-tier POPs may selectively retrieve content from origin-facing POPs in instances where the origin-facing POP is expected to provide the content more rapidly than the origin server.

19 Claims, 6 Drawing Sheets

(51) Int. Cl.
*H04L 12/733* (2013.01)
*H04L 29/06* (2006.01)

(52) U.S. Cl.
CPC .......... *H04L 67/18* (2013.01); *H04L 67/2842* (2013.01); *H04L 67/327* (2013.01); *H04L 67/42* (2013.01)

(56) References Cited

U.S. PATENT DOCUMENTS

| | | | |
|---|---|---|---|
| 5,341,477 A | 8/1994 | Pitkin et al. | |
| 5,459,837 A | 10/1995 | Caccavale | |
| 5,611,049 A | 3/1997 | Pitts | |
| 5,627,889 A | 5/1997 | Eslambolchi | |
| 5,701,467 A | 12/1997 | Freeston | |
| 5,764,910 A | 6/1998 | Shachar | |
| 5,774,660 A | 6/1998 | Brendel et al. | |
| 5,815,649 A | 9/1998 | Utter et al. | |
| 5,852,717 A | 12/1998 | Bhide et al. | |
| 5,892,914 A | 4/1999 | Pitts | |
| 5,893,116 A | 4/1999 | Simmonds et al. | |
| 5,895,462 A | 4/1999 | Toki | |
| 5,905,248 A | 5/1999 | Russell et al. | |
| 5,933,811 A | 8/1999 | Angles et al. | |
| 5,937,427 A | 8/1999 | Shinagawa et al. | |
| 5,974,454 A | 10/1999 | Apfel et al. | |
| 5,991,306 A | 11/1999 | Burns et al. | |
| 5,999,274 A | 12/1999 | Lee et al. | |
| 6,006,264 A | 12/1999 | Colby et al. | |
| 6,016,512 A | 1/2000 | Huitema | |
| 6,018,619 A | 1/2000 | Allard et al. | |
| 6,026,452 A | 2/2000 | Pitts | |
| 6,038,601 A | 3/2000 | Lambert et al. | |
| 6,052,718 A | 4/2000 | Gifford | |
| 6,078,960 A | 6/2000 | Ballard | |
| 6,085,234 A | 7/2000 | Pitts et al. | |
| 6,092,100 A | 7/2000 | Berstis et al. | |
| 6,098,096 A | 8/2000 | Tsirigotis et al. | |
| 6,108,703 A | 8/2000 | Leighton et al. | |
| 6,128,279 A | 10/2000 | O'Neil et al. | |
| 6,151,631 A | 11/2000 | Ansell et al. | |
| 6,157,942 A | 12/2000 | Chu et al. | |
| 6,167,438 A | 12/2000 | Yates et al. | |
| 6,167,446 A | 12/2000 | Lister et al. | |
| 6,173,316 B1 | 1/2001 | De Boor et al. | |
| 6,182,111 B1 | 1/2001 | Inohara et al. | |
| 6,182,125 B1 | 1/2001 | Borella et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,223,209 B1 | 4/2001 | Watson et al. | |
| 6,223,288 B1 | 4/2001 | Byrne | |
| 6,243,761 B1 | 6/2001 | Mogul et al. | |
| 6,256,671 B1 | 7/2001 | Strentzsch et al. | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,324,580 B1 | 11/2001 | Jindal et al. | |
| 6,330,602 B1 | 12/2001 | Law et al. | |
| 6,338,082 B1 | 1/2002 | Schneider | |
| 6,345,308 B1 | 2/2002 | Abe | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,377,257 B1 | 4/2002 | Borrel et al. | |
| 6,386,043 B1 | 5/2002 | Millins | |
| 6,389,532 B1 | 5/2002 | Gupta et al. | |
| 6,405,252 B1* | 6/2002 | Gupta ............. | H04L 12/14 370/229 |
| 6,408,360 B1 | 6/2002 | Chamberlain et al. | |
| 6,411,967 B1 | 6/2002 | Van Renesse | |
| 6,415,280 B1 | 7/2002 | Farber et al. | |
| 6,430,607 B1 | 8/2002 | Kavner | |
| 6,438,592 B1 | 8/2002 | Killian | |
| 6,442,165 B1 | 8/2002 | Sitaraman et al. | |
| 6,452,925 B1 | 9/2002 | Sistanizadeh et al. | |
| 6,457,047 B1 | 9/2002 | Chandra et al. | |
| 6,459,909 B1 | 10/2002 | Bilcliff et al. | |
| 6,473,804 B1 | 10/2002 | Kaiser et al. | |
| 6,484,143 B1 | 11/2002 | Swildens et al. | |
| 6,484,161 B1 | 11/2002 | Chipalkatti et al. | |
| 6,493,765 B1 | 12/2002 | Cunningham et al. | |
| 6,505,241 B2 | 1/2003 | Pitts | |
| 6,523,036 B1 | 2/2003 | Hickman et al. | |
| 6,529,910 B1 | 3/2003 | Fleskes | |
| 6,529,953 B1 | 3/2003 | Van Renesse | |
| 6,553,413 B1 | 4/2003 | Leighton et al. | |
| 6,560,610 B1 | 5/2003 | Eatherton et al. | |
| 6,564,380 B1* | 5/2003 | Murphy ................ | H04N 5/232 725/86 |
| 6,611,873 B1 | 8/2003 | Kanehara | |
| 6,622,168 B1 | 9/2003 | Datta | |
| 6,633,324 B2 | 10/2003 | Stephens, Jr. | |
| 6,643,357 B2 | 11/2003 | Lumsden | |
| 6,643,707 B1 | 11/2003 | Booth | |
| 6,654,807 B2 | 11/2003 | Farber et al. | |
| 6,658,462 B1 | 12/2003 | Dutta | |
| 6,665,706 B2 | 12/2003 | Kenner et al. | |
| 6,678,717 B1 | 1/2004 | Schneider | |
| 6,678,791 B1 | 1/2004 | Jacobs et al. | |
| 6,681,282 B1 | 1/2004 | Golden et al. | |
| 6,687,846 B1 | 2/2004 | Adrangi et al. | |
| 6,694,358 B1 | 2/2004 | Swildens et al. | |
| 6,697,805 B1 | 2/2004 | Choquier et al. | |
| 6,718,324 B2 | 4/2004 | Edlund et al. | |
| 6,724,770 B1 | 4/2004 | Van Renesse | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,760,721 B1 | 7/2004 | Chasen et al. | |
| 6,769,031 B1 | 7/2004 | Bero | |
| 6,782,398 B1 | 8/2004 | Bahl | |
| 6,785,704 B1 | 8/2004 | McCanne | |
| 6,795,434 B1 | 9/2004 | Kumar et al. | |
| 6,799,214 B1 | 9/2004 | Li | |
| 6,804,706 B2 | 10/2004 | Pitts | |
| 6,810,291 B2 | 10/2004 | Card et al. | |
| 6,810,411 B1 | 10/2004 | Coughlin et al. | |
| 6,829,654 B1 | 12/2004 | Jungck | |
| 6,862,607 B1 | 3/2005 | Vermeulen | |
| 6,868,439 B2 | 3/2005 | Basu et al. | |
| 6,874,017 B1 | 3/2005 | Inoue et al. | |
| 6,917,951 B2 | 7/2005 | Orbits et al. | |
| 6,925,499 B1 | 8/2005 | Chen et al. | |
| 6,928,467 B2 | 8/2005 | Peng et al. | |
| 6,928,485 B1 | 8/2005 | Krishnamurthy et al. | |
| 6,941,562 B2 | 9/2005 | Gao et al. | |
| 6,944,167 B1 | 9/2005 | McPherson | |
| 6,950,848 B1 | 9/2005 | Yousefi'zadeh et al. | |
| 6,961,783 B1 | 11/2005 | Cook et al. | |
| 6,963,850 B1 | 11/2005 | Bezos et al. | |
| 6,968,389 B1 | 11/2005 | Menditto et al. | |
| 6,976,090 B2 | 12/2005 | Ben-Shaul et al. | |
| 6,981,017 B1 | 12/2005 | Kasriel et al. | |
| 6,981,025 B1 | 12/2005 | Frazier et al. | |
| 6,985,945 B2 | 1/2006 | Farhat et al. | |
| 6,986,018 B2 | 1/2006 | O'Rourke et al. | |
| 6,990,526 B1 | 1/2006 | Zhu | |
| 6,996,616 B1 | 2/2006 | Leighton et al. | |
| 7,003,555 B1 | 2/2006 | Jungck | |
| 7,006,099 B2 | 2/2006 | Gut et al. | |
| 7,007,089 B2 | 2/2006 | Freedman | |
| 7,010,578 B1 | 3/2006 | Lewin et al. | |
| 7,010,598 B2 | 3/2006 | Sitaraman et al. | |
| 7,024,466 B2 | 4/2006 | Outten et al. | |
| 7,027,582 B2 | 4/2006 | Khello et al. | |
| 7,031,445 B2 | 4/2006 | Lumsden | |
| 7,032,010 B1 | 4/2006 | Swildens et al. | |
| 7,058,633 B1 | 6/2006 | Gnagy et al. | |
| 7,058,706 B1 | 6/2006 | Iyer et al. | |
| 7,058,953 B2 | 6/2006 | Willard et al. | |
| 7,062,158 B1 | 6/2006 | Ayaki | |

(56) References Cited

U.S. PATENT DOCUMENTS

| | | | |
|---|---|---|---|
| 7,065,587 | B2 | 6/2006 | Huitema et al. |
| 7,072,982 | B2 | 7/2006 | Teodosiu et al. |
| 7,076,633 | B2 | 7/2006 | Tormasov et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,095,715 | B2 | 8/2006 | Buckman et al. |
| 7,096,266 | B2 | 8/2006 | Lewin et al. |
| 7,099,936 | B2 | 8/2006 | Chase et al. |
| 7,103,645 | B2 | 9/2006 | Leighton et al. |
| 7,114,160 | B2 | 9/2006 | Suryanarayana et al. |
| 7,117,262 | B2 | 10/2006 | Bai et al. |
| 7,133,905 | B2 | 11/2006 | Dilley et al. |
| 7,136,922 | B2 | 11/2006 | Sundaram et al. |
| 7,139,808 | B2 | 11/2006 | Anderson et al. |
| 7,139,821 | B1 | 11/2006 | Shah et al. |
| 7,143,169 | B1 | 11/2006 | Champagne et al. |
| 7,143,170 | B2 | 11/2006 | Swildens et al. |
| 7,146,560 | B2 | 12/2006 | Dang et al. |
| 7,149,747 | B1 | 12/2006 | Cheng et al. |
| 7,149,809 | B2 | 12/2006 | Barde et al. |
| 7,152,118 | B2 | 12/2006 | Anderson, IV et al. |
| 7,162,539 | B2 | 1/2007 | Garcie-Luna-Aceves |
| 7,165,117 | B1 | 1/2007 | Sitaraman et al. |
| 7,171,469 | B2 | 1/2007 | Ackaouy et al. |
| 7,174,382 | B2 | 2/2007 | Ramanathan et al. |
| 7,185,046 | B2 | 2/2007 | Ferstl et al. |
| 7,185,063 | B1 | 2/2007 | Kasriel et al. |
| 7,185,084 | B2 | 2/2007 | Sirivara et al. |
| 7,188,214 | B1 | 3/2007 | Kasriel et al. |
| 7,194,522 | B1 | 3/2007 | Swildens et al. |
| 7,194,552 | B1 | 3/2007 | Schneider |
| 7,200,667 | B2 | 4/2007 | Teodosiu et al. |
| 7,200,673 | B1 | 4/2007 | Augart |
| 7,216,170 | B2 | 5/2007 | Ludvig et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,249,196 | B1 | 7/2007 | Peiffer et al. |
| 7,251,675 | B1 | 7/2007 | Kamakura et al. |
| 7,254,626 | B1 | 8/2007 | Kommula et al. |
| 7,254,634 | B1 | 8/2007 | Davis et al. |
| 7,254,636 | B1 | 8/2007 | O'Toole, Jr. et al. |
| 7,257,581 | B1 | 8/2007 | Steele et al. |
| 7,260,598 | B1 | 8/2007 | Liskov et al. |
| 7,260,639 | B2 | 8/2007 | Afergan et al. |
| 7,269,784 | B1 | 9/2007 | Kasriel et al. |
| 7,272,227 | B1 | 9/2007 | Beran |
| 7,274,658 | B2 | 9/2007 | Bornstein et al. |
| 7,284,056 | B2 | 10/2007 | Ramig |
| 7,289,519 | B1 | 10/2007 | Liskov |
| 7,293,093 | B2 | 11/2007 | Leighton |
| 7,308,499 | B2 | 12/2007 | Chavez |
| 7,310,686 | B2 | 12/2007 | Uysal |
| 7,316,648 | B2 | 1/2008 | Kelly et al. |
| 7,318,074 | B2 | 1/2008 | Iyengar et al. |
| 7,320,131 | B1 | 1/2008 | O'Toole, Jr. |
| 7,321,918 | B2 | 1/2008 | Burd et al. |
| 7,337,968 | B2 | 3/2008 | Wilz, Sr. et al. |
| 7,339,937 | B2 | 3/2008 | Mitra et al. |
| 7,340,505 | B2 | 3/2008 | Lisiecki et al. |
| 7,343,397 | B2 | 3/2008 | Kochanski |
| 7,350,075 | B1 | 3/2008 | Eastham et al. |
| 7,362,703 | B1 | 4/2008 | Taft et al. |
| 7,363,291 | B1 | 4/2008 | Page |
| 7,363,626 | B2 | 4/2008 | Koutharapu et al. |
| 7,370,089 | B2 | 5/2008 | Boyd et al. |
| 7,372,809 | B2 | 5/2008 | Chen |
| 7,373,416 | B2 | 5/2008 | Kagan et al. |
| 7,376,736 | B2 | 5/2008 | Sundaram et al. |
| 7,380,078 | B2 | 5/2008 | Ikegaya et al. |
| 7,389,354 | B1 | 6/2008 | Sitaraman et al. |
| 7,392,236 | B2 | 6/2008 | Rusch et al. |
| 7,398,301 | B2 | 7/2008 | Hennessey et al. |
| 7,406,512 | B2 | 7/2008 | Swildens et al. |
| 7,406,522 | B2 | 7/2008 | Riddle |
| 7,409,712 | B1 | 8/2008 | Brooks et al. |
| 7,430,610 | B2 | 9/2008 | Pace et al. |
| 7,441,045 | B2 | 10/2008 | Skene et al. |
| 7,441,261 | B2 | 10/2008 | Slater et al. |
| 7,451,230 | B2 | 11/2008 | Corrado et al. |
| 7,454,457 | B1 | 11/2008 | Lowery et al. |
| 7,454,500 | B1 | 11/2008 | Hsu et al. |
| 7,461,170 | B1 | 12/2008 | Taylor et al. |
| 7,464,142 | B2 | 12/2008 | Flurry et al. |
| 7,472,201 | B1 | 12/2008 | Aitken |
| 7,478,148 | B2 | 1/2009 | Neerdaels |
| 7,492,720 | B2 | 2/2009 | Pruthi et al. |
| 7,496,651 | B1 | 2/2009 | Joshi |
| 7,499,998 | B2 | 3/2009 | Toebes et al. |
| 7,502,836 | B1 | 3/2009 | Menditto et al. |
| 7,505,464 | B2 | 3/2009 | Okmianski et al. |
| 7,506,034 | B2 | 3/2009 | Coates et al. |
| 7,519,705 | B1 | 4/2009 | Papagiannaki et al. |
| 7,519,720 | B2 | 4/2009 | Fishman et al. |
| 7,519,726 | B2 | 4/2009 | Palliyil et al. |
| 7,523,181 | B2 | 4/2009 | Swildens et al. |
| 7,543,024 | B2 | 6/2009 | Holstege |
| 7,548,947 | B2 | 6/2009 | Kasriel et al. |
| 7,552,235 | B2 | 6/2009 | Chase et al. |
| 7,555,542 | B1 | 6/2009 | Ayers et al. |
| 7,561,571 | B1 | 7/2009 | Lovett et al. |
| 7,565,407 | B1 | 7/2009 | Hayball |
| 7,568,032 | B2 | 7/2009 | Feng et al. |
| 7,573,916 | B1 | 8/2009 | Bechtolsheim et al. |
| 7,574,499 | B1 | 8/2009 | Swildens et al. |
| 7,581,009 | B1 | 8/2009 | Hsu et al. |
| 7,584,507 | B1 | 9/2009 | Nucci |
| 7,593,935 | B2 | 9/2009 | Sullivan |
| 7,594,189 | B1 | 9/2009 | Walker et al. |
| 7,596,619 | B2 | 9/2009 | Leighton et al. |
| 7,613,815 | B1 | 11/2009 | Prakash et al. |
| 7,617,222 | B2 | 11/2009 | Coulthard et al. |
| 7,623,460 | B2 | 11/2009 | Miyazaki |
| 7,624,169 | B2 | 11/2009 | Lisiecki et al. |
| 7,624,264 | B2 | 11/2009 | Aura et al. |
| 7,626,940 | B2 | 12/2009 | Jain |
| 7,631,101 | B2 | 12/2009 | Sullivan et al. |
| 7,640,296 | B2 | 12/2009 | Fuchs et al. |
| 7,650,376 | B1 | 1/2010 | Blumenau |
| 7,653,689 | B1 | 1/2010 | Champagne et al. |
| 7,653,700 | B1 | 1/2010 | Bahl et al. |
| 7,653,725 | B2 | 1/2010 | Yahiro et al. |
| 7,657,613 | B1 | 2/2010 | Hanson et al. |
| 7,657,622 | B1 | 2/2010 | Douglis et al. |
| 7,661,027 | B2 | 2/2010 | Langen et al. |
| 7,664,831 | B2 | 2/2010 | Cartmell et al. |
| 7,664,879 | B2 | 2/2010 | Chan et al. |
| 7,676,570 | B2 | 3/2010 | Levy et al. |
| 7,680,897 | B1 | 3/2010 | Carter et al. |
| 7,684,394 | B1 | 3/2010 | Cutbill et al. |
| 7,685,109 | B1 | 3/2010 | Ransil et al. |
| 7,685,251 | B2 | 3/2010 | Houlihan et al. |
| 7,685,270 | B1 | 3/2010 | Vermeulen et al. |
| 7,685,273 | B1 | 3/2010 | Anastas et al. |
| 7,693,813 | B1 | 4/2010 | Cao et al. |
| 7,693,959 | B2 | 4/2010 | Leighton et al. |
| 7,698,418 | B2 | 4/2010 | Shimada et al. |
| 7,702,724 | B1 | 4/2010 | Brydon et al. |
| 7,706,740 | B2 | 4/2010 | Collins et al. |
| 7,707,071 | B2 | 4/2010 | Rigole |
| 7,707,314 | B2 | 4/2010 | McCarthy et al. |
| 7,711,647 | B2 | 5/2010 | Gunaseelan et al. |
| 7,711,788 | B2 | 5/2010 | Lev Ran et al. |
| 7,716,367 | B1 | 5/2010 | Leighton et al. |
| 7,725,602 | B2 | 5/2010 | Liu et al. |
| 7,725,658 | B2 | 5/2010 | Lang et al. |
| 7,730,187 | B2 | 6/2010 | Raciborski et al. |
| 7,739,400 | B2 | 6/2010 | Lindbo et al. |
| 7,747,720 | B2 | 6/2010 | Toebes et al. |
| 7,748,005 | B2 | 6/2010 | Romero et al. |

(56) References Cited

U.S. PATENT DOCUMENTS

| | | |
|---|---|---|
| 7,756,017 B2 | 7/2010 | Goyal et al. |
| 7,756,032 B2 | 7/2010 | Feick et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,680 B2 | 12/2010 | Phatak |
| 7,853,719 B1 | 12/2010 | Cao et al. |
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,890,989 B1 | 2/2011 | Hofrichter et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,713 B1 | 4/2011 | Day et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 4/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,705 B1 | 8/2011 | Sebastian et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 10/2011 | Baumback et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,155,126 B1 | 4/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,175,863 B1 | 5/2012 | Ostermeyer et al. |
| 8,180,720 B1 | 5/2012 | Kovacs et al. |
| 8,190,682 B2 | 5/2012 | Paterson-Jones et al. |
| 8,195,837 B2 | 6/2012 | McCarthy et al. |
| 8,209,695 B1 | 6/2012 | Pruyne et al. |
| 8,218,965 B1 | 7/2012 | Uhlhorn et al. |
| 8,219,647 B2 * | 7/2012 | Harvell ............... G06F 16/9574 709/219 |
| 8,224,942 B1 | 7/2012 | Presotto et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 * | 10/2012 | Eggleston ............ H04L 61/2007 709/245 |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,296,786 B2 | 10/2012 | Faust et al. |
| 8,301,600 B1 | 10/2012 | Helmick et al. |
| 8,301,645 B1 | 10/2012 | Crook |
| 8,316,124 B1 | 10/2012 | Baumback et al. |
| 8,321,568 B2 | 11/2012 | Sivasubramanian et al. |
| 8,321,588 B2 | 11/2012 | Richardson et al. |
| 8,331,370 B2 | 11/2012 | Hamilton et al. |
| 8,341,745 B1 | 12/2012 | Chat et al. |
| 8,356,074 B1 * | 1/2013 | Ehrlich ................ H04L 67/322 709/203 |
| 8,380,831 B2 | 2/2013 | Barber |
| 8,380,851 B2 | 2/2013 | McCarthy et al. |
| 8,392,928 B1 | 3/2013 | Forys et al. |
| 8,396,908 B2 | 3/2013 | Moore et al. |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,423,667 B2 | 4/2013 | Richardson et al. |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,854 B1 * | 5/2013 | Jasinskyj ............. H04L 67/289 709/224 |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,458,360 B2 | 6/2013 | Richardson et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,883 B2 | 7/2013 | Day et al. |
| 8,478,903 B2 | 7/2013 | Farber et al. |
| 8,489,737 B2 | 7/2013 | Baumback et al. |
| 8,504,721 B2 | 8/2013 | Hsu et al. |
| 8,504,775 B2 | 8/2013 | Plamondon |
| 8,510,428 B2 | 8/2013 | Joshi |
| 8,510,807 B1 * | 8/2013 | Elazary ................ G06F 9/541 726/4 |

(56) References Cited

U.S. PATENT DOCUMENTS

| | | | |
|---|---|---|---|
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,963 B2 | 11/2013 | Trahan et al. |
| 8,577,992 B1 | 11/2013 | Richardson et al. |
| 8,589,996 B2 | 11/2013 | Ma et al. |
| 8,606,926 B2 | 12/2013 | Ulevitch |
| 8,606,996 B2 | 12/2013 | Richardson et al. |
| 8,612,565 B2 | 12/2013 | Schneider |
| 8,612,588 B1 * | 12/2013 | Ehrlich ............... G06F 16/95 709/224 |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,645,700 B2 | 2/2014 | Smith et al. |
| 8,667,127 B2 | 2/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,694,642 B2 | 4/2014 | Dempsky et al. |
| 8,712,950 B2 | 4/2014 | Smith et al. |
| 8,732,309 B1 | 5/2014 | Richardson et al. |
| 8,738,766 B1 * | 5/2014 | Kazerani ............... H04L 45/70 709/224 |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,775,553 B2 | 7/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 8/2014 | Sorenson, III et al. |
| 8,819,187 B1 * | 8/2014 | Hofmann ............ H04L 67/2814 709/219 |
| 8,819,283 B2 | 8/2014 | Richardson et al. |
| 8,826,032 B1 | 9/2014 | Yahalom et al. |
| 8,843,625 B2 | 9/2014 | Baumback et al. |
| 8,902,897 B2 | 9/2014 | Hamilton et al. |
| 8,885,584 B2 | 11/2014 | Praveenkumar et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,971,328 B2 | 2/2015 | Judge et al. |
| 8,972,580 B2 | 3/2015 | Fleischman et al. |
| 8,976,711 B2 | 3/2015 | Li et al. |
| 9,003,035 B1 | 4/2015 | Richardson et al. |
| 9,003,040 B1 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,071,502 B2 | 5/2015 | Baumback et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,106,701 B2 | 8/2015 | Richardson et al. |
| 9,116,803 B1 | 8/2015 | Agrawal et al. |
| 9,118,543 B2 | 8/2015 | Baumback et al. |
| 9,118,680 B1 | 8/2015 | Dunlap et al. |
| 9,130,756 B2 | 9/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 10/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,099 B2 | 12/2015 | Baumback et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,282,032 B2 | 3/2016 | Judge et al. |
| 9,294,391 B1 | 3/2016 | Mostert |
| 9,300,535 B2 | 3/2016 | Popli et al. |
| 9,323,577 B2 | 4/2016 | Marr et al. |
| 9,332,078 B2 | 5/2016 | Sivasubramanian et al. |
| 9,367,929 B2 | 5/2016 | Bettis et al. |
| 9,386,038 B2 | 7/2016 | Martini |
| 9,391,949 B1 | 7/2016 | Richardson et al. |
| 9,407,539 B1 | 8/2016 | Dickinson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,491,073 B2 | 10/2016 | Baumback et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,388 B1 | 1/2017 | Li et al. |
| 9,544,394 B2 | 1/2017 | Richardson et al. |
| 9,571,389 B2 | 2/2017 | Richardson et al. |
| 9,584,328 B1 | 2/2017 | Graham-Cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,660,890 B2 | 5/2017 | Baumback et al. |
| 9,699,108 B2 | 7/2017 | Popli et al. |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |

(56) References Cited

U.S. PATENT DOCUMENTS

| | | | |
|---|---|---|---|
| 9,742,795 B1 | 8/2017 | Radlein et al. |
| 9,760,420 B1 | 9/2017 | Letz et al. |
| 9,769,248 B1 | 9/2017 | Krishnan et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 9,996,501 B1 | 6/2018 | Nelson et al. |
| 9,996,572 B2 | 6/2018 | Calder et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,027,739 B1 | 7/2018 | Krishnan et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 8/2018 | Baldwin |
| 10,063,459 B2 | 8/2018 | Judge et al. |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B2 | 10/2018 | Baumback et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,148,542 B2 | 11/2018 | Baumback et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,205,644 B2 | 2/2019 | Baumback et al. |
| 10,225,365 B1 | 3/2019 | Hotchkies et al. |
| 10,257,307 B1 | 4/2019 | Baldwin |
| 10,264,062 B2 | 4/2019 | Richardson et al. |
| 10,270,878 B1 | 4/2019 | Uppal et al. |
| 10,284,446 B2 | 4/2019 | Baumback et al. |
| 10,305,797 B2 | 5/2019 | Richardson et al. |
| 10,311,371 B1 | 5/2019 | Hotchkies et al. |
| 10,348,639 B2 | 7/2019 | Puchala et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,447,648 B2 | 10/2019 | Bliss et al. |
| 10,462,025 B2 | 10/2019 | Baumback et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 10,630,771 B1 | 4/2020 | Garza et al. |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,742,550 B2 | 8/2020 | Richardson et al. |
| 10,742,593 B1 | 8/2020 | Vasquez et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Navaneetha et al. |
| 10,831,549 B1 | 11/2020 | Radhakrishnan et al. |
| 10,931,738 B2 | 2/2021 | Richardson et al. |
| 10,938,884 B1 | 3/2021 | Baldwin et al. |
| 10,958,501 B1 | 3/2021 | Richardson et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007413 A1 | 1/2002 | Garcia-Luna-Aceves et al. |
| 2002/0009079 A1* | 1/2002 | Jungck ............... H04L 63/0263 370/389 |
| 2002/0010783 A1 | 1/2002 | Primak et al. |
| 2002/0010798 A1 | 1/2002 | Ben-Shaul et al. |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087797 A1* | 7/2002 | Adrangi ............... H04L 63/10 711/133 |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |

(56) References Cited

U.S. PATENT DOCUMENTS

| | | |
|---|---|---|
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0221000 A1 | 11/2003 | Cherkasova et al. |
| 2003/0229682 A1 | 12/2003 | Day |
| 2003/0233423 A1* | 12/2003 | Dilley ............... H04L 29/06 709/214 |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0019781 A1 | 1/2004 | Chari et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0098478 A1 | 5/2004 | Koetke et al. |
| 2004/0105544 A1 | 6/2004 | Haneda et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |

(56) References Cited

U.S. PATENT DOCUMENTS

| | | |
|---|---|---|
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173855 A1 | 8/2006 | Turner et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 10/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282505 A1 | 12/2006 | Hasha et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |

(56) References Cited

U.S. PATENT DOCUMENTS

| | | |
|---|---|---|
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0195800 A1 | 8/2007 | Yang et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 12/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0005275 A1 | 1/2008 | Overton et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0028463 A1 | 1/2008 | Dagon et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0175222 A1 | 7/2008 | Barnes et al. |
| 2008/0184357 A1 | 7/2008 | Drako et al. |
| 2008/0189437 A1 | 8/2008 | Halley |
| 2008/0201332 A1 | 8/2008 | Souders et al. |
| 2008/0201401 A1 | 8/2008 | Pugh et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |

(56) References Cited

U.S. PATENT DOCUMENTS

| | | |
|---|---|---|
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0172167 A1 | 7/2009 | Drai et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0235915 A1 | 9/2010 | Memon et al. |
| 2010/0250710 A1* | 9/2010 | Cadwell ............... H04L 65/60 709/219 |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 12/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029398 A1 | 2/2011 | Boudville |
| 2011/0029598 A1 | 2/2011 | Arnold et al. |
| 2011/0035469 A1 | 2/2011 | Smith et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |

(56) References Cited

U.S. PATENT DOCUMENTS

| | | |
|---|---|---|
| 2011/0078230 A1 | 3/2011 | Sepulveda |
| 2011/0082916 A1* | 4/2011 | Swanson ............ H04L 29/08081 709/219 |
| 2011/0085654 A1 | 4/2011 | Jana et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 5/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0295940 A1 | 12/2011 | Saleem et al. |
| 2011/0295942 A1 | 12/2011 | Raghunath et al. |
| 2011/0296053 A1 | 12/2011 | Medved et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0023226 A1 | 1/2012 | Petersen et al. |
| 2012/0031626 A1 | 2/2012 | Clayton et al. |
| 2012/0036238 A1 | 2/2012 | Sundaram et al. |
| 2012/0041899 A1 | 2/2012 | Greene et al. |
| 2012/0041970 A1* | 2/2012 | Ghosh ................... H04L 67/289 707/769 |
| 2012/0042381 A1 | 2/2012 | Antonakakis et al. |
| 2012/0054860 A1 | 2/2012 | Wyschogrod et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0014249 A1 | 4/2012 | Mao et al. |
| 2012/0089700 A1* | 4/2012 | Safruti ................. H04L 67/2842 709/217 |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0204176 A1 | 8/2012 | Tian et al. |
| 2012/0209942 A1* | 8/2012 | Zehavi ................. H04L 67/2842 709/213 |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1* | 9/2012 | Hartrick ............... H04L 69/163 709/203 |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0272224 A1 | 10/2012 | Brackman |
| 2012/0278229 A1 | 11/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1* | 1/2013 | Li ..................... H04N 21/2402 709/224 |
| 2013/0018945 A1 | 1/2013 | Vendrow et al. |
| 2013/0019311 A1 | 1/2013 | Swildens et al. |
| 2013/0034099 A1 | 2/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1* | 2/2013 | Lientz .................... H04L 67/22 709/224 |
| 2013/0054675 A1 | 2/2013 | Jenkins et al. |
| 2013/0055374 A1 | 2/2013 | Kustarz et al. |
| 2013/0061306 A1 | 3/2013 | Sinn |
| 2013/0067530 A1 | 3/2013 | Spektor et al. |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0084898 A1 | 4/2013 | Li et al. |
| 2013/0086001 A1 | 4/2013 | Bhogal et al. |
| 2013/0089005 A1 | 4/2013 | Li et al. |
| 2013/0103834 A1 | 4/2013 | Dzerve et al. |
| 2013/0111035 A1 | 5/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |

(56) References Cited

U.S. PATENT DOCUMENTS

| | | |
|---|---|---|
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 11/2013 | Mankovski et al. |
| 2013/0305083 A1 | 11/2013 | Machida |
| 2013/0311555 A1* | 11/2013 | Laoutaris ............ H04L 12/6418 709/204 |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 12/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108474 A1 | 4/2014 | David et al. |
| 2014/0108672 A1 | 4/2014 | Ou et al. |
| 2014/0119194 A1 | 5/2014 | Raciborski et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164584 A1* | 6/2014 | Joe ................. H04L 61/1511 709/223 |
| 2014/0164817 A1 | 6/2014 | Bartholomy et al. |
| 2014/0165061 A1 | 6/2014 | Greene et al. |
| 2014/0172944 A1* | 6/2014 | Newton ............ H04L 41/0869 709/202 |
| 2014/0181268 A1 | 6/2014 | Stevens et al. |
| 2014/0189069 A1* | 7/2014 | Gero ................ H04L 67/2833 709/219 |
| 2014/0195686 A1 | 7/2014 | Yeager et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0324774 A1 | 10/2014 | Chen et al. |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0036493 A1 | 2/2015 | Cj et al. |
| 2015/0067171 A1 | 3/2015 | Yum |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 4/2015 | Bergman |
| 2015/0106864 A1 | 4/2015 | Li et al. |
| 2015/0149600 A1* | 5/2015 | Thibeault ................ H04L 67/22 709/219 |
| 2015/0149631 A1 | 5/2015 | Lissack |
| 2015/0154051 A1 | 6/2015 | Kruglick |
| 2015/0156172 A1 | 6/2015 | Nandi et al. |
| 2015/0156279 A1 | 6/2015 | Vaswani et al. |
| 2015/0180995 A1* | 6/2015 | Hofmann ................ H04L 69/14 709/213 |
| 2015/0188734 A1 | 7/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0256647 A1 | 9/2015 | Richardson et al. |
| 2015/0264009 A1 | 9/2015 | Scharber et al. |
| 2015/0271031 A1 | 9/2015 | Beevers |
| 2015/0288647 A1 | 10/2015 | Chhabra et al. |
| 2015/0317118 A1 | 11/2015 | Orikasa et al. |
| 2015/0339136 A1 | 11/2015 | Suryanarayanan et al. |
| 2015/0341431 A1 | 11/2015 | Hartrick et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0028598 A1* | 1/2016 | Khakpour ............... H04L 43/50 709/224 |
| 2016/0028755 A1 | 1/2016 | Vasseur et al. |
| 2016/0036857 A1 | 2/2016 | Foxhoven et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0132600 A1 | 5/2016 | Woodhead et al. |
| 2016/0142251 A1 | 5/2016 | Contreras et al. |
| 2016/0164761 A1* | 6/2016 | Sathyanarayana ........................... H04L 65/4084 709/219 |
| 2016/0164799 A1 | 6/2016 | Popli et al. |
| 2016/0182454 A1 | 6/2016 | Phonsa et al. |
| 2016/0182542 A1 | 6/2016 | Staniford |
| 2016/0241639 A1 | 8/2016 | Brookins et al. |
| 2016/0253262 A1 | 9/2016 | Nadgowda |
| 2016/0255042 A1 | 9/2016 | Newton |
| 2016/0274929 A1 | 9/2016 | King |
| 2016/0294678 A1 | 10/2016 | Khakpour et al. |
| 2016/0337426 A1 | 11/2016 | Shribman et al. |
| 2016/0366202 A1 | 12/2016 | Phillips et al. |
| 2016/0373789 A1 | 12/2016 | Tsukagoshi |
| 2017/0041428 A1 | 2/2017 | Katsev |
| 2017/0099254 A1 | 4/2017 | Leach et al. |
| 2017/0109316 A1 | 4/2017 | Hack et al. |
| 2017/0126796 A1 | 5/2017 | Hollis et al. |
| 2017/0142062 A1 | 5/2017 | Richardson et al. |
| 2017/0153980 A1 | 6/2017 | Araujo et al. |
| 2017/0155678 A1 | 6/2017 | Araujo et al. |
| 2017/0155732 A1 | 6/2017 | Araujo et al. |
| 2017/0163425 A1 | 6/2017 | Kaliski, Jr. |
| 2017/0170973 A1 | 6/2017 | Gill et al. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0187768 A1* | 6/2017 | Huang ................ H04L 67/2842 |

(56) References Cited

U.S. PATENT DOCUMENTS

| | | |
|---|---|---|
| 2017/0214761 A1 | 7/2017 | Hsu et al. |
| 2017/0257340 A1 | 9/2017 | Richardson et al. |
| 2017/0374121 A1 | 12/2017 | Phillips et al. |
| 2018/0011913 A1 | 1/2018 | Kapanipathi et al. |
| 2018/0027040 A1 | 1/2018 | Bae |
| 2018/0063193 A1 | 3/2018 | Chandrashekhar et al. |
| 2018/0077109 A1 | 3/2018 | Hoeme et al. |
| 2018/0077110 A1 | 3/2018 | Huston, III et al. |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0173526 A1 | 6/2018 | Prinsloo et al. |
| 2018/0176615 A1 | 6/2018 | Hannu et al. |
| 2018/0191817 A1 | 7/2018 | Richardson et al. |
| 2018/0212880 A1 | 7/2018 | Mostert |
| 2018/0278717 A1 | 9/2018 | Richardson et al. |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0337885 A1 | 11/2018 | Singh et al. |
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0089542 A1 | 3/2019 | Richardson et al. |
| 2019/0089818 A1 | 3/2019 | Choi |
| 2019/0121739 A1 | 4/2019 | Richardson et al. |
| 2019/0129908 A1 | 5/2019 | Kumarasamy |
| 2019/0140922 A1 | 5/2019 | Ellsworth et al. |
| 2019/0173941 A1 | 6/2019 | Puchala et al. |
| 2019/0173972 A1 | 6/2019 | MacCarthaigh et al. |
| 2019/0190998 A1 | 6/2019 | Sivasubramanian et al. |
| 2019/0268265 A1 | 7/2019 | Richardson et al. |
| 2019/0297137 A1 | 9/2019 | Richardson et al. |
| 2019/0327510 A1 | 10/2019 | Kalagi et al. |
| 2019/0354484 A1 | 11/2019 | Marshall et al. |
| 2020/0065132 A1 | 2/2020 | Mercier et al. |
| 2020/0084268 A1 | 3/2020 | Hollis et al. |
| 2020/0195677 A1 | 6/2020 | Uppal et al. |
| 2020/0195753 A1 | 6/2020 | Richardson et al. |
| 2020/0265096 A1 | 8/2020 | Raftery |
| 2020/0287817 A1 | 9/2020 | Howard et al. |
| 2020/0366638 A1 | 11/2020 | Vasquez et al. |
| 2020/0389534 A1 | 12/2020 | Sivasubramanian et al. |
| 2020/0389541 A1 | 12/2020 | Baldwin et al. |
| 2021/0021692 A1 | 1/2021 | Richardson et al. |
| 2021/0042163 A1 | 2/2021 | Radhakrishnan et al. |

FOREIGN PATENT DOCUMENTS

| | | |
|---|---|---|
| CN | 1422468 A | 6/2003 |
| CN | 1511399 A | 7/2004 |
| CN | 1605182 A | 4/2005 |
| CN | 101189598 A | 5/2008 |
| CN | 101431539 A | 5/2009 |
| CN | 101460907 A | 6/2009 |
| CN | 101631133 A | 1/2010 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 3748216 B2 | 2/2006 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2001/045349 A2 | 6/2001 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |
| WO | WO 2018/236597 A1 | 12/2018 |

OTHER PUBLICATIONS

"Final Office Action dated Sep. 5, 2012," U.S. Appl. No. 12/652,541; dated Sep. 5, 2012; 40 pages.
"Notice of Allowance dated Jan. 4, 2013," U.S. Appl. No. 12/652,541; dated Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=6010099 70, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.

(56) References Cited

OTHER PUBLICATIONS

"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw.html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006),pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, in Proc. of Networking 2005, all pages.
Gunther et al, "Measuring Round Trip Times to determine the Distance between WLAN Nodes", Dec. 18, 2004, Technical University Berlin, all pages.
Guo, F. Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables_Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1," Jul. 30, 2003, CNet News.com, retrieved May 3, 2006, http://news.zdnet.com/2100-3513_22-5057752.html, 8 pages.

(56) References Cited

OTHER PUBLICATIONS

Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.

(56) References Cited

OTHER PUBLICATIONS

Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Extended Search Report in European Application No. 18156163 dated Sep. 3, 2018.
Examination Report in Indian Application No. 4487/DELNP/2013 dated Dec. 28, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Report on Patentability in PCT/US/2016/066848 dated Jun. 19, 2018.
International Search Report and Written Opinion in PCT/US2017/055156 dated Dec. 13, 2017.
Office Action in Indian Application No. 2823/DELNP/2015 dated Oct. 25, 2019.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.
Extended European Search Report in Application No. 16876655.8 dated Aug. 20, 2019.
Partial Search Report in European Application No. 16876655.8 dated May 15, 2019.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Office Action in European Application No. 13770602.4 dated Mar. 11, 2019.
International Preliminary Report on Patentability and Written Opinion in PCT/US2017/055156 dated Apr. 9, 2019.
International Search Report and Written Opinion in PCT/US2018/036634 dated Sep. 11, 2018.
Extended Search Report in European Applicaton No. 19184826.6 dated Jan. 17, 2020.
International Preliminary Report on Patentability and Written Opinion in PCT/US2018/036634 dated Dec. 24, 2019.
Office Action in Brazilian Application No. BR112015005588-5 dated Jan. 14, 2020.
Office Action in Chinese Application No. 201810426428.0 dated Jul. 20, 2020 in 25 pages.
Second Office Action in Chinese Application No. 201610828846.3 dated Aug. 5, 2020.
Office Action issued in connection with European Patent Application No. 18734734 dated Oct. 19, 2020.

* cited by examiner

ROUTING FOR ORIGIN-FACING POINTS OF PRESENCE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Content providers (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical content to client computing devices. In some instances, each data center providing a set of content may be referred to as a point-of-presence ("POP"). A content delivery system can maintain POPs over a wide area (or worldwide) to enable the system to efficiently service requests from clients in a variety of locations.

To utilize a CDN, a content provider generally designates one or more computing devices or data centers to maintain primary copies of content, which are sometimes referred to as "origin servers." Each POP within the CDN can maintain all or a portion of the content maintained on the origin server (e.g., within a data cache of the CDN). When a client requests a content item from a POP, the POP can determine whether that the requested content item is maintained at the POP. If so, the POP can provide the requested content item to the client directly. If not, the POP may first retrieve the content item from the origin server, and thereafter provide the content item to the client. This process of returning content not presently maintained at a POP is sometimes referred to as a "cache miss." Cache misses are generally undesirable, in that they result in delays to fulfill client requests (e.g., due to the time required to retrieve content from the origin server) as well as increased load on the origin server itself.

DETAILED DESCRIPTION

Figure 1:
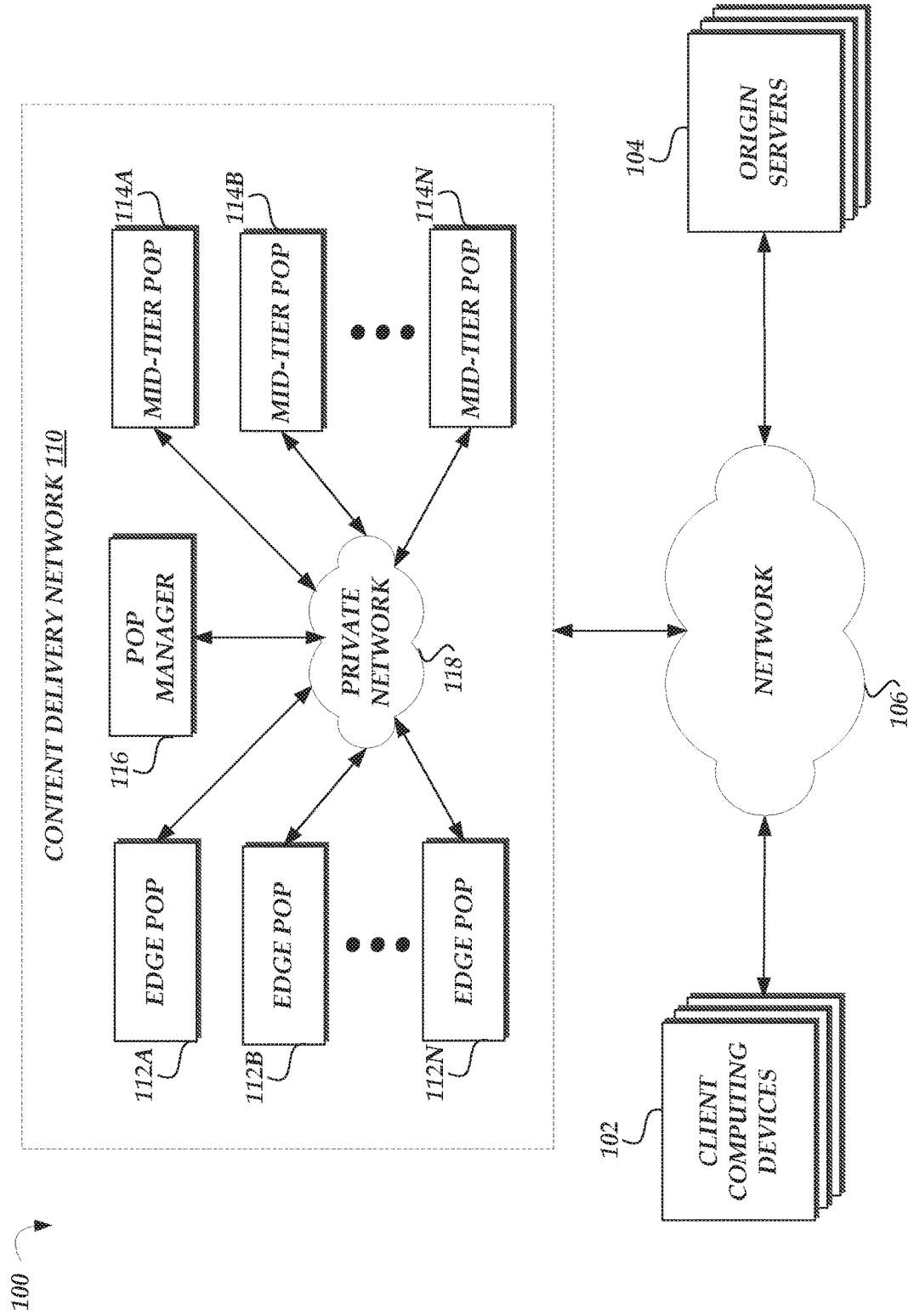
FIG. 1 is a block diagram depicting an illustrative logical network 100 including multiple client computing devices and origin servers, as well as a content delivery network ("CDN") including a point of presence ("POP") manager, multiple edge POPs, and multiple mid-tier POPs.

Generally described, aspects of the present disclosure relate to implementing and managing second-level points of presence ("POPs") within a content delivery network ("CDN"). Second-level POPs can generally refer to a computing device or collection of computing devices that may act as intermediary sources for various sets of content (each of which can be generally referred to as a content "distribution"), between edge POPs of a CDN (e.g., those POPs that receive and process client requests for content on the CDN, which may also be referred to as "client-facing" POPs) and origin servers (e.g., those devices that serve as primary sources for content distributed via the CDN). Specifically, second-level POPs, which may also be referred to herein as "mid-tier POPs" or "origin-facing POPs" may enable cache misses to be handled on the CDN without requiring interaction with the origin server. Thus, the use of second-level POPs can substantially improve the performance of the CDN in handling cache misses, both by reducing the time required to provide content to a client and by reducing the computing resources needed at the origin server. The present disclosure further describes systems and methods for automatically determining locations for placement of second-level POPs based on the location of an origin server for a specific distribution (e.g., a specific set of content). Specifically, aspects of the present disclosure enable a second-level POP to be established in close geographic or network proximity to an origin server. Such placement of a second-level POP can improve the ability of the second-level POP and origin server to rapidly communicate, thus further reducing the computing resources required by the origin server. Still further, the present disclosure describes systems and methods for routing requests within a CDN utilizing second-level POPs. Specifically, aspects of the present disclosure enable edge POPs to selectively retrieve uncached content (e.g., content corresponding to a cache miss) from either second-level POPs or from origin servers, based at least partly on a geographic or network distance between the edge POP and the second-level POPs or origin servers. In this manner, retrieval of uncached content can occur via second-level POPs only when such retrieval is expected to improve the performance of the CDN (e.g., with respect to time required to service client requests, reduction of computing resources needed at an origin server, or both).

Content providers may generally maintain one or more primary sources for a distribution, such as web servers operated by the content providers, which are generally referred to as "origin servers." Because a content provider may not wish to maintain an extensive network of origin servers, these servers are often located in one geographical location, and associated with limited computing resources. This configuration can lead to large geographic and network distance existing between the origin server and the various client devices that are provided content. To reduce the time required to provide content to client devices, and to reduce the computing resources required at an origin server, a content provider may utilize a CDN, which includes a set of edge POPs distributed at various geographical locations, each of can maintain at least a portion of the content of the distribution (e.g., as initially provided to the edge POP by the origin server). These edge POPs may receive client requests for content of the distribution, and respond to these requests utilizing versions of the content stored at the edge POP. However, the storage capabilities of edge POPs are generally also limited, such that not all content of all content of all distributions associated with the edge POP can be maintained concurrently. To address this issue, when a client requests content of a distribution, and that content is not maintained at the edge POP (sometimes referred to as a "cache miss"), the edge POP may first retrieve the content from an origin server associated with the distribution. The process of retrieving content from an origin server can increase the time required to service the request as well as increasing the load on the origin server, thus negating a portion of the benefit provided by the CDN.

In accordance with aspects of the present disclosure, the negative effects of cache misses on a CDN may be eliminated or reduced by use of one or more mid-tier POPs within the CDN. Each mid-tier POP may serve as a potential intermediary source of content for edge POPs, such that when a cache miss occurs at the edge POP, the requested content can be retrieved from a mid-tier POP, rather than an origin server providing that content. Because edge POPs and mid-tier POPs may communicate with one another via specialized communication protocols or via a private computing network, retrieval of content from a mid-tier POP may occur more rapidly than would be possible from an origin server. Moreover, retrieval of content from a mid-tier POP can reduce the use of computing resources at the origin server. Thus, the use of mid-tier POPs can enable the CDN to rapidly provide content to clients even in the instance that a cache miss occurs at an edge POP.

The CDN may provide multiple mid-tier POPs, each associated with specific distributions. In one embodiment, each mid-tier POP may be assigned to act as an intermediary content source for distributions with origin servers nearby to the mid-tier POP, either in geographical or network terms, to enable rapid communication between the mid-tier POP and the assigned origin servers. Thus, when a content provider requests the use of a mid-tier POP on the CDN for a distribution of content, the CDN may locate a mid-tier POP nearby to an origin server acting as a primary source for that distribution of content, and assign the origin server to that mid-tier POP, such that the mid-tier POP acts as an intermediary content source for the distribution. Such automatic location of mid-tier POPs may eliminate the need for content providers to manually specify desired mid-tier POPs within the CDN. As will be described in more detail below, the CDN may utilize passively obtained network data, actively obtained network data, or both to determine the proximity of mid-tier POPs to origin servers. In another embodiment, each mid-tier POP may be assigned to act as an intermediary content source for all distributions associated with the CDN. This may reduce the need to assign mid-tier POPs to specific distributions, but may also increase the computing resources utilized by each mid-tier POP.

In some instances, the use of mid-tier POPs may not be expected to increase the performance of the CDN. For example, where an origin server has excess unused computing resources, and where the origin server is closer (e.g., in geographic or network distance) to an edge POP than is an assigned mid-tier POP, it may be more beneficial for the edge POP to communicate directly with the origin server than to utilize the mid-tier POP as an intermediary content source. Thus, embodiments of the present application further enable an edge POP to selectively retrieve content of a distribution from either an origin server associated with that distribution or a mid-tier POP of the CDN storing content of the distribution, based on an expected performance of communications with the origin server and mid-tier POP. To enable such selective retrieval, the edge POP can maintain routing information for individual origin servers associated with each distribution, as well as for the mid-tier POPs provided by a CDN that are associated with one or more distributions. When a request for uncached content of a given distribution is processed at the edge POP, the edge POP can dynamically generate a routing table indicating a preferred source for the uncached content, and retrieve the uncached content from the preferred source. In this manner, edge POPs can be configured to utilize mid-tier POPs only in instances where use of mid-tier POPs is expected to increase the performance of the CDN (e.g., by reducing the time required to service client requests, by reducing the computing resources needed at the origin server, or both).

As will be appreciated by one of skill in the art in light of the description above, the embodiments disclosed herein substantially increase the ability of computing systems, such as CDNs, to rapidly and effectively distribute content to client computing devices, even in instances of cache misses. Thus, the presently disclosed embodiments represent an improvement in the functioning of such computing systems. Moreover, the presently disclosed embodiments address technical problems inherent within computing systems; specifically, the limited capacity of computing systems to store information, as well as the limited ability of such systems to process network-based requests. These technical problems are addressed by the various technical solutions described herein, including the utilization of mid-tier POPs, the assignment of mid-tier POPs to distributions based on geographic or network proximity to origin servers associated with those distributions, and the selective routing of requests for content to mid-tier POPs or origin servers (e.g., based on a dynamically created routing table related to the mid-tier POPs or origin servers). Thus, the present application represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network 100 including multiple client computing devices 102 and origin servers 104 in communication with a CDN 110 via a network 106. As shown in FIG. 1, the CDN 110 includes a plurality of edge POPs 112, a plurality of mid-tier POPs 112, and a POP manager 116 in communication via a private network. The various elements of the CDN 110 are described in more detail below.

While the client computing devices 102 and the origin servers 104 are shown as a group within FIG. 1, the client computing devices 102 and origin servers 104 may be geographically distant, and independently owned or operated. For example, the client computing devices 102 could represent a multitude of users in various global, continental, or regional locations accessing the CDN 110. Further, the origin servers 104 could represent a multitude of related or distinct parties that have associated with the CDN 110 to provide sets of content, such as web sites, multimedia, or other digital, network-deliverable content (each generally referred to as a "distribution") to the client computing devices 102. Accordingly, the groupings of client computing devices 102 and origin servers 104 within FIG. 1 is intended to represent a logical, rather than physical, grouping. Similarly, each of the components of the CDN 110 may be located within geographically diverse areas. For example, the edge POPs 112 and mid-tier POPs 114 within the CDN 110 (described in more detail below) may be globally, continentally, or regionally disparate, in order to provide a wide geographical presence for the CDN 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, origin servers 104, and CDN 110 is depicted as having a single connection to the network 106, individual components of the client computing devices 102, origin servers 104, and CDN 110 may be connected to the network 106 at disparate points. Accordingly, communication times and capabilities may vary between the components of FIG. 1.

Client computing devices 102 may include any number of different computing devices capable of communicating with the CDN 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Using client computing devices 102, clients may interact with and access distributions of content on the CDN 110 originating from or otherwise associated with origin servers 104 of various content providers. For example, after requesting content associated with a specific distribution (e.g., a specific web site, video file, etc.), the client computing devices 102 may be routed to an edge POP 112 configured to provide content of that distribution on behalf of the origin server 104. Various mechanisms for routing of client computing devices 102 to edge POPs 112 within a CDN 110 are known within the art, and thus will not be described in detail herein.

Origin servers 104 may include any computing device owned or operated by an entity that has provided one or more sets of content ("distributions") to the CDN 110 for subsequent transmission to client computing devices 102. For example, origin servers 104 may include servers hosting web sites, streaming audio, video, or multimedia services, data analytics services, or other network-accessible services. The origin servers 104 may include primary versions of content within various distributions, which may be retrieved by various POPs of the CDN 110 for subsequent transmission to the client computing devices 102.

To receive and handle requests for content from client computing devices 102, the CDN 110 can include a plurality of edge POPs 112A through 112N. Each edge POP 112 may include a variety of computing devices collectively configured to maintain all or a portion of the content associated with the various distributions provided by origin servers 104. As will be discussed in more detail below with respect to FIG. 2, each edge POP 112 may include any number of processors, data stores, or networking components operating in conjunction to facilitate retrieval of content. Each edge POP 112 includes a cache of content from a variety of distributions. Because size of the cache may be limited (e.g., due to the limited size of a data store on which the cache is implemented), the edge POP 112 may implement various algorithms or procedures for determining what content should be maintained within the cache. Illustratively, each edge POP 112 may implement a cache eviction policy, which maintains within the cache a set of content items most recently requested by client computing devices 102, and evicts less recently used content.

Because the cache of an edge POP 112 is limited, it is possible for a client computing device 102 to transmit a request to an edge POP 112 for content that is not cached at the edge POP 112. Requests for uncached content can generally be referred to as "cache misses." Traditionally, an edge POP 112 can handle a cache miss by initiating a request for the content to an origin server 104 associated with the content. However, as noted above, such processing is often undesirable, as it increases the time (e.g., latency) required to provide the requested content to the client computing device 102, and may increase the computing resources needed at the origin server 104. In instances were cache misses cause the edge POPs 112 to transmit a high volume of requests to the origin servers 104, the origin server 104 may fail to respond to all requests, thus resulting in errors at the client computing devices 102.

To reduce or eliminate the negative effects of cache misses, the illustrative CDN 110 of FIG. 1 also includes a plurality of mid-tier POPs 114. Each mid-tier POP 114 may function similarly to an edge POP 112, by receiving and processing requests for content associated with the origin servers 104. As in the case of an edge POP 112, each mid-tier POP 114 may maintain a limited cache of content associated with the origin servers 104, which can be utilized to service requests for that content. In the instance that a mid-tier POP 114 receives a request for content not available in the mid-tier POP 114's cache, the mid-tier POP 114 may retrieve the content from the origin server 104 before servicing the request.

The caches of edge POPs 112 and mid-tier POPs 114 may be configured according to both the desired speed and size of the cache. In some instances, cache size and speed are at least partially interchangeable, such that the same or similar hardware can provide either a high-speed, low-size cache or a low-speed, high-size cache. For example, where a cache is implemented by a set of hard disk drives (HDDs), a small set of content can be replicated across the drives, such that the drives can work in parallel to provide high-speed access to the content. Conversely, the set of hard disk drives may provide little or no replication of content, such that a higher amount of content can be stored, but that retrieval of the content is slowed due to the limited availability of that content. In other instances, the speed and size of a cache may be varied based on the hardware utilized to implement the cache. For example, a high-speed, low-sized cache may be implemented in a set of solid-state drives (SSDs), while a low-speed, large-sized cache may be implemented in magnetic HDDs. Accordingly, by modifying the configuration or hardware utilized, the edge POPs 112 may be configured to implement a high-speed, low-size cache when compared to the cache of the mid-tier POPs 114. This configuration can enable the edge POPs 112 to facilitate most content requests rapidly, while also ensuring that a substantial portion of requested uncached at the edge POP 112 are stored within the cache of the mid-tier POP 114, and thus may be serviced without interaction with a corresponding origin server 104.

In one embodiment, each mid-tier POP 114 may be associated with all distributions (e.g., sets of content made available by the origin servers 104), such that content of any distribution may be retrieved from each mid-tier POP 114. In this manner, each distribution's content may be highly replicated across the mid-tier POPs 114, reducing the requests made to the origin servers 104, especially for highly popular content. In another embodiment, a mid-tier POP 114 may be assigned to cache content only of specific distributions. For example, the mid-tier POP 114A may be assigned to cache content of a first distribution (e.g., associated with a first origin server 104), but not of a second distribution (e.g., associated with a second origin server 104). Such assignment may, for example, prevent the mid-tier POP 114A from evicting content of the first distribution based on the popularity of other distributions.

The components of the CDN 110, including the edge POPs 112, mid-tier POPs 114, and POP manager 116 may communicate via a private network 118. The private network 118 may include any combination of various network types described above operated on behalf of the CDN 110, alone or in conjunction with other services. While shown as distinct from the network 106, the private network 118 in some instances may be physically co-mingled with the network 106. For example, the private network 118 may be formed by one or more leased lines on the network 106 that provide dedicated communications to the CDN 110. Because the private network 118 is operated on behalf of the CDN 110 (e.g., independently or in conjunction with other services associated with the CDN 110), the number of delays and errors caused by transmission of data across the private network 118 may generally be less than the number of delays and errors caused by transmission of data across the network 106. Moreover, because the private network 118 is operated on behalf of the CDN 110, the functionality of the private network 118 (e.g., the protocols used therein or the configuration of network devices operating as part of the private network 118) may be modified by the CDN 110 without reducing the ability of the CDN 110 to interact with the network 106.

To facilitate assignment of mid-tier POPs 114 to origin servers 104, the CDN 110 can further include a POP manager 116 device. As will be described in more detail below, the POP manager 116 may obtain information regarding proximities of mid-tier POPs 114 and origin servers 104, and utilize that information to assign mid-tier POPs 114 to distributions originating from those origin servers 104. For example, where a content provider associated with a distribution initially provided by a first origin server 104 wishes to utilize the mid-tier POPs 114, the POP manger 116 may determine which mid-tier POP 114 of the CDN 110 is proximate to the first origin server 104, and assign that mid-tier POP 114 as a second-level cache for the distribution initially provided by the first origin server 104. Frequently, transmission times between computing devices over a network are dependent, at least in part, on the distance between the devices. Thus, assignment of mid-tier POPs 114 that are proximate to an origin server 104 can beneficially reduce the computing resources necessary to retrieve content from the origin server 104, increasing the performance of the CDN 110.

In one embodiment, proximity between mid-tier POPs 114 and origin servers 104 may be determined based at least in part on geographic distance. For example, the geographic location of each mid-tier POP 114 and origin server 104 may be provided to the CDN by an administrator of the respective mid-tier POPs 114 and servers 104, or may be determined by the POP manager 116 based on a network address of the respective mid-tier POPs 114 and servers 104 (e.g., utilizing internet protocol ["IP"] geo-location techniques that are known in the art). Thereafter, the POP manager 116 may determine a mid-tier POP 114 that is proximate to an origin server 104 by computing the distance between these geographic locations. In another embodiment, proximity between mid-tier POPs 114 and origin servers 104 may be determined based at least in part on passively gathered network information. For example, each mid-tier POP 114 may function to monitor the round trip communication time needed to communicate with various origin servers 104, or other computing devices that are similar to the origin servers 104 (e.g., computing devices that exist within the same subnet as the origin servers 104). This round trip communication time can then be utilized (exclusively or in connection with additional information) as a network distance between the mid-tier POP 114 and origin servers 104. In yet another embodiment, proximity between mid-tier POPs 114 and origin servers 104 may be determined based at least in part on actively gathered information, such as network probes (e.g., Internet Control Message Protocol ["ICMP"] packets) transmitted from the mid-tier POPs 114 to the origin servers 104 (or computing devices sharing a subnet with the origin servers 104).

In accordance with embodiments of the present disclosure, proximity information may also be utilized by edge POPs 112 to determine whether the use of a mid-tier POP 114 is preferable to direct communication with an origin server 104. Illustratively, each edge POP 112 may be configured to communicate with a mid-tier POP 114 assigned to a distribution only when that mid-tier POP 114 is nearer to the edge POP 112 than an origin server 104 associated with that distribution. In this manner, an edge POP 112 can be prevented from requesting content of a distribution from a distant mid-tier POP 114, when an origin server 104 of the distribution is nearby and available to service the request. To enable the selective routing of requests to either a mid-tier POP 114 of an origin server 104, each edge POP 112 may maintain routing information for both mid-tier POPs 114 and origin servers 104. This routing information may designate, for example, a distance (e.g., geographical or network) to each of the mid-tier POPs 114 and origin servers 104. Similarly to above, distances between the edge POPs 112 and the mid-tier POPs 114 and servers 104 may be determined based on geographic data, passively gathered network information, or actively gathered network information.

In one embodiment, an edge POP 112 can maintain routing information for mid-tier POPs 114 separately from routing information for origin servers 114, and can dynamically combine the information in order to service requests for content associated with an individual origin server 104. Utilization of separate routing information may be beneficial, for example, because while the number of origin servers 104 associated with the CDN 110 may be large, only one or a few of these origin servers 104 may be associated with content required at the edge POP 112. Thus, combination of routing information for both mid-tier POPs 112 and origin servers 104 would likely result in a routing table that includes substantial irrelevant information. However, by maintaining separate routing information for the mid-tier POPs 114 and the origin servers 112, an edge POP 112 may combine only those portions of each set of routing information that are relevant to a current request. For example, the edge POP 112 may retrieve, from the routing information for all origin servers 104, routing information for a set of origin servers 104 associated with a distribution including the required content. The edge POP 112 may further retrieve, from the routing information for all mid-tier POPs 104, routing information for a set of mid-tier POPs 104 assigned to the distribution. The edge POP 112 may then combine this routing information to determine a nearest mid-tier POP 114 or origin server 104 associated with the requested information. The edge POP 112 can then retrieve the required information from the nearest mid-tier POP 114 or origin server 104, and fulfill the request.

It will be appreciated by those skilled in the art that the CDN 110 may have fewer or greater components than are illustrated in FIG. 1. For example, while shown as distinct in FIG. 1, in some embodiments, POPs within the CDN 110 may operate as both edge POPs 112 and mid-tier POPs 114. As a further example, in some instances, each of the components of the CDN 110 may communicate with one another directly via the network 106, and thus, the private network 118 may be omitted. In addition, the CDN 110 could include various web services and/or peer-to-peer network configurations. Thus, the depiction of the CDN 110 in FIG. 1 should be taken as illustrative. For example, in some embodiments, components of the CDN 110, such as the POP manager 116, may be executed by one more virtual machines implemented within one or more of the edge POPs 112 or mid-tier POPs 114. In other embodiments, the POP manager 116 may be implemented collectively by the edge POPs 112 or mid-tier POPs 114 (e.g., as a peer-to-peer service). Further, any one or more of the edge POPs 112, mid-tier POPs 112, and POP manager 116 may be embodied in a plurality of components, each executing an instance of the respective edge POPs 112, mid-tier POPs 112, and POP manager 116. A server or other computing component implementing any one of the respective edge POPs 112, mid-tier POPs 112, and POP manager 116 may include a network interface, memory, processing unit, and computer readable medium drive, all of which may communicate with each other by way of a communication bus. The network interface may provide connectivity over the network 106, private network 118, and/or other networks or computer systems. The processing unit may communicate to and from memory containing program instructions that the processing unit executes in order to operate the respective edge POPs 112, mid-tier POPs 112, and/or POP manager 116. The memory may generally include RAM, ROM, other persistent and auxiliary memory, and/or any non-transitory computer-readable media.

Figure 2:
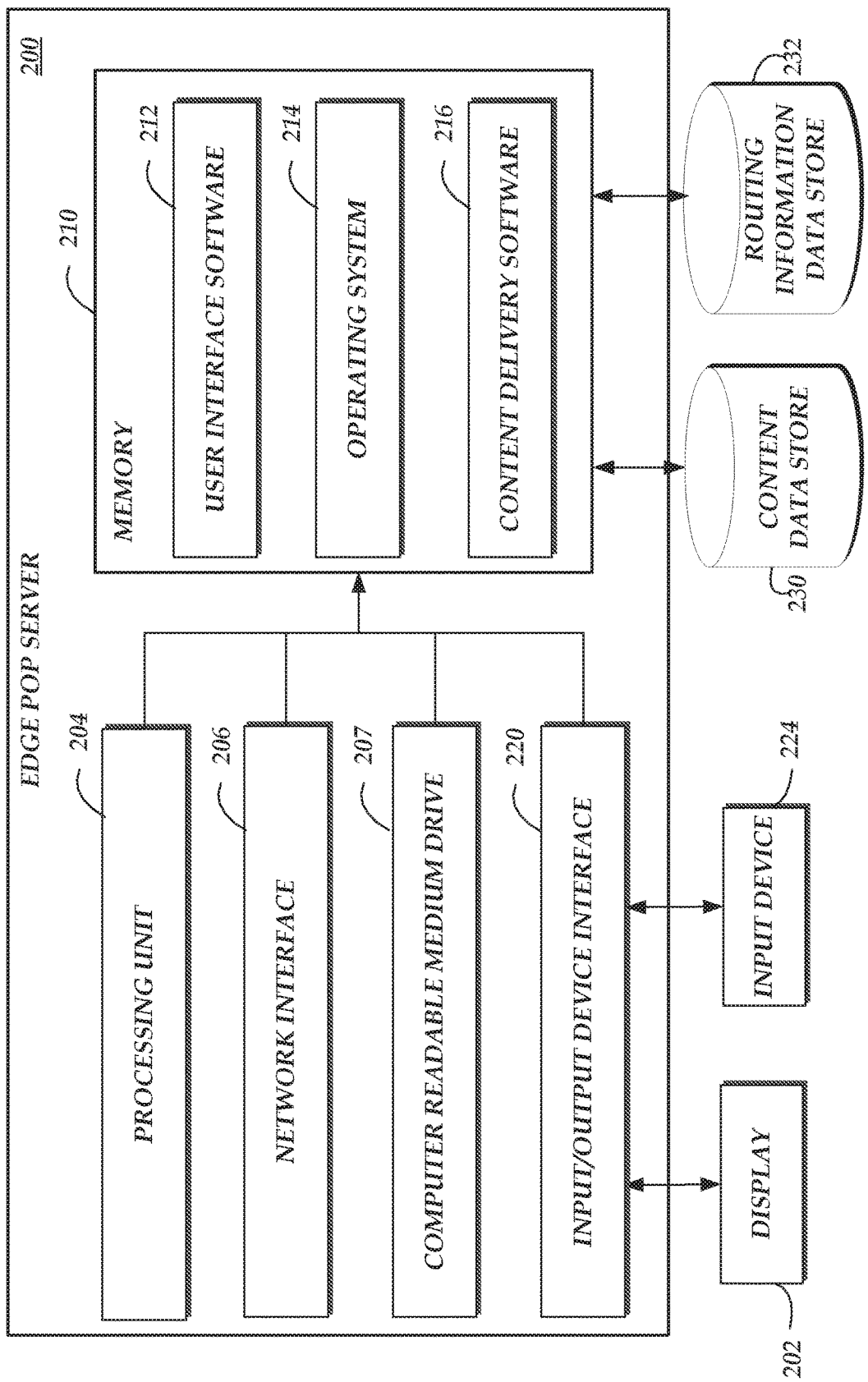
FIG. 2 is a block diagram depicting an illustrative configuration of one embodiment of a server implementing an edge POP of FIG. 1.

FIG. 2 depicts one embodiment of an architecture of a server 200 that may implement all or a portion of an edge POP 112 described herein. The general architecture of server 200 depicted in FIG. 2 includes an arrangement of computer hardware and software components that may be used to implement aspects of the present disclosure. As illustrated, the server 200 includes a processing unit 204, a network interface 306, a computer readable medium drive 207, an input/output device interface 220, a display 302, and an input device 224, all of which may communicate with one another by way of a communication bus. The network interface 206 may provide connectivity to one or more networks or computing systems, such as the networks 106 and 118 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channels (e.g., via the network interface 206). While shown as a single device, each edge POP 112 may be implemented by a set of distinct servers 200 collectively operating to implement the functionality described herein.

The memory 210 may include computer program instructions that the processing unit 204 executes in order to implement one or more embodiments of the present disclosure. The memory 210 generally includes RAM, ROM and/or persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as the data stores 230 and 232.

The data stores 230 and 232 may be any persistent or substantially persistent storage device (e.g., a hard disk drive, solid state disk drive, flash memory, etc.) utilized to store information utilized by the server 200. Specifically, the data store 230 may be utilized to store content associated with various distributions (e.g., as a cache of the content of those distributions). The routing information data store 232 may be utilized to store routing information associated with other components of the CDN 110, such as mid-tier POP 114, as well as routing information associated with the various origin servers 104.

In addition to the user interface module 212, the memory 210 may include content delivery software 216 that may be executed by the processing unit 204. In one embodiment, the content delivery software 216 implements various aspects of the present disclosure, including processing requests for content cached at the edge POP server 200 (e.g., by use of the content stored within the content data store 230), and the selective routing of requests for uncached content to nearby mid-tier POPs 114 or origin servers 104 (e.g., utilizing the routing information within the routing information data store 232).

Figure 3:
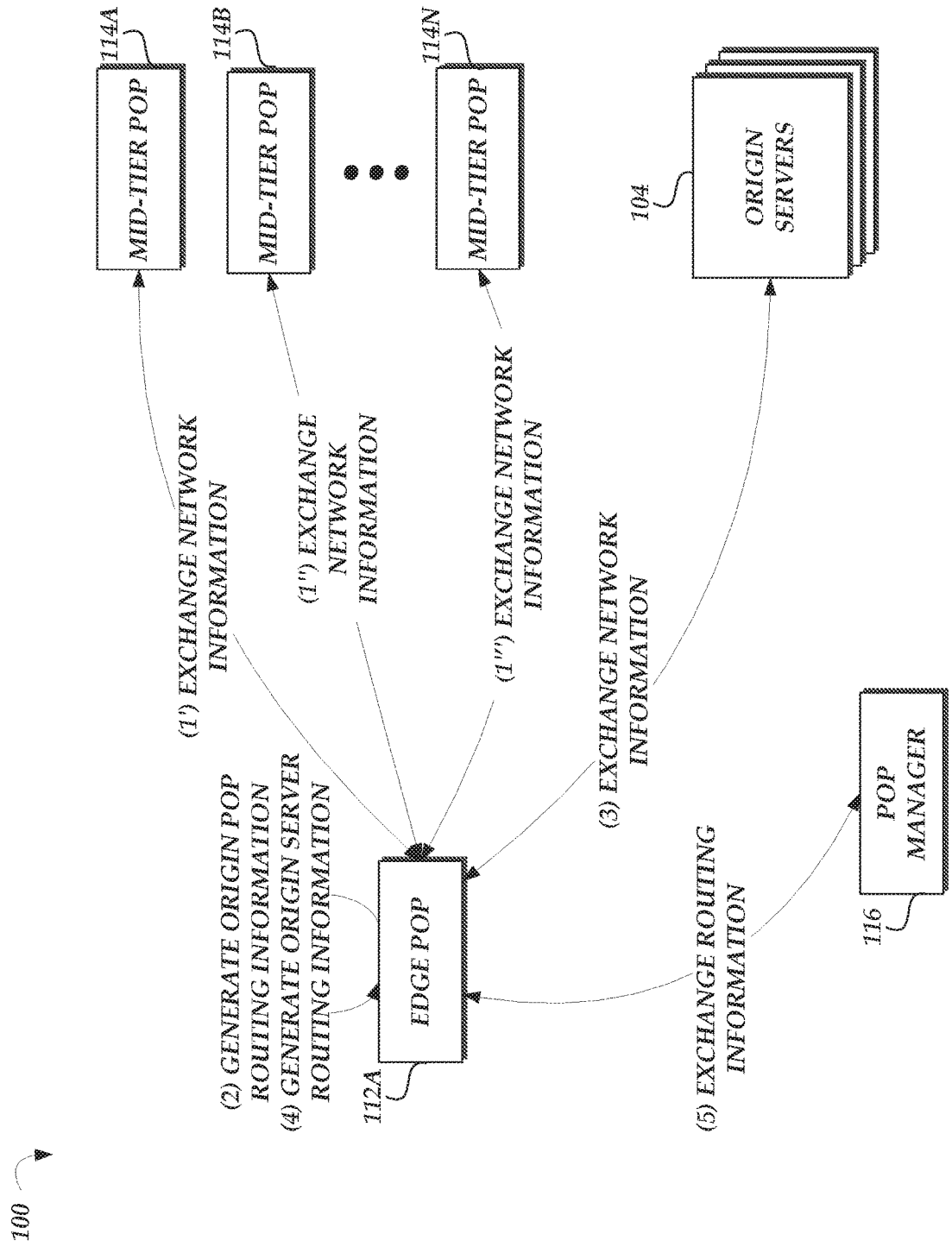
FIG. 3 is a block diagram depicting interactions between an edge POP and other components of FIG. 1 to generate mid-tier POP and origin server routing information, which may be used by the edge POP to route client requests for content received at the CDN.

With reference to FIG. 3, an illustrative set of interactions are depicted for generating routing information at an edge POP 112A. As discussed above, this routing information may be utilized by the edge POP 112A to determine, in instances where requested content is not available at the edge POP 112A, whether the content should be retrieved from a mid-tier POP 114 or an origin server 104 associated with the content. The interactions begin at (1), where the edge POP 112A exchanges network information with the various mid-tier POPs 114. In one embodiment, this exchange of network information may include transmission, from the edge POP 112A, of network probes (e.g., ICMP packets). In another embodiment, this exchange of network information may occur during normal operating of the edge POP 112A (e.g., based on requests to retrieve content from the mid-tier POP 114).

Thereafter, at (2), the edge POP 112A utilizes information regarding communication with the mid-tier POPs 114 to generate routing information for each mid-tier POP 114. Illustratively, the edge POP 112A may record a round-trip time of communications with the mid-tier POPs 114, as well as a network bandwidth available between the edge POP 112A and the mid-tier POPs 114 and a number of intermediary devices between the edge POP 112A and the mid-tier POPs 114. These metrics may be utilized (e.g., individually or in combination) by the edge POP 112A to determine a network distance between the edge POP 112A and each mid-tier POP 114, which may be stored as mid-tier POP routing information.

At (3), the edge POP 112A further communicates with some or all of the origin servers 104. Similarly to the communication with the mid-tier POPs 114, communication with the origin servers 104 may include transmission of network probes as well as communications that occur during normal operation of the edge POP 112 (e.g., requests for content from the origin servers 104). At (4), the edge POP 112A may utilize information regarding communication with the origin servers 104 to generate routing information for some or all of the origin servers 114.

At (5), the edge POP 112A may communicate with the POP manager 116 to exchange routing information. Illustratively, the edge POP 112A may transmit to the POP manager 116 all or a portion of the mid-tier POP routing information or the origin server routing information to the POP manager 116. The POP manager 116, in turn, may notify the edge POP 112A of assignments between the mid-tier POPs 114 and the origin servers 104. In some embodiments, the POP manager 116 may further notify the edge POP 112A of additional information regarding the mid-tier POPs 114 or origin servers 104, such as load or capacity information of the mid-tier POPs 114 or origin servers 104. The edge POP 112A may incorporate some or all information received by the POP manager 116 into the mid-tier POPPOP routing information and/or the origin server routing information.

One illustrative example of mid-tier POP routing information that may be generated by the edge POP 112A in accordance with the present disclosure is shown below, as TABLE 1.

TABLE 1

| Mid-tier POP | Served distributions | Network distance (latency) | Allowed cache misses per second |
|---|---|---|---|
| 114A | D1, D4 | 25 ms | 800 |
| 114B | D2 | 10 ms | 1000 |
| 114C | D1, D5, D6 | 60 ms | 2500 |

One of skill in the art will appreciate that the information of TABLE 1 may be modified to address the specific implementation of the CDN 110. For example, the reference numbers of the various mid-tier POPs 114 may be replaced with network identifiers (e.g., IP addresses or domain names) of the mid-tier POPs 114, while the reference numbers for various distributions (e.g., D1-D6) may be replaced with identifiers of the distributions. As a further example, the network distance of TABLE 1 may incorporate other network metrics in addition to or alternatively to latency, such as bandwidth or numbers of hops. As yet another example, alternatively or in addition to an amount of allowed cache misses per second, load information for each mid-tier POP may be represented in a variety of manners, such as a real-time load on the mid-tier POPs 114 (e.g., as reported by the POP manager 116). In some embodiments, information shown in TABLE 1 may be omitted from routing information generated by the edge POP 112A. For example, where each mid-tier POP 114 is assigned to cache content from each distribution, information regarding distributions served by mid-tier POPs 114 may be omitted from the routing information.

One illustrative example of origin server routing information that may be generated by the edge POP 112A in accordance with the present disclosure is shown below, as TABLE 2.

TABLE 2

| Origin server | Served distributions | Network distance (latency) | Allowed cache misses per second |
|---|---|---|---|
| 104A | D1 | 155 ms | 100 |
| 104B | D2 | 70 ms | 70 |
| 104C | D1 | 225 ms | 300 |

As in Table 1, the information of TABLE 2 may be modified to address the specific implementation of the CDN 110. For example, the reference numbers of the various origin servers 104 may be replaced with network identifiers (e.g., IP addresses or domain names) of the origin servers 104, or network distance information may incorporate other network metrics in addition or alternatively to latency, such as bandwidth or number of hops. Alternatively or in addition to an amount of allowed cache misses per second, load information for each origin server may be represented in a variety of manners, such as a real-time load on the origin servers 104 (e.g., as reported by the POP manager 116).

In operation of the edge POP 112A, the routing information for the origin servers 104 and the mid-tier POPs 114 (e.g., as represented by TABLES 1 and 2, above) can be combined in order to selectively route requests for uncached content between the origin servers 104 and the mid-tier POPs 114. For example, where uncached content associated with distribution 'D1' is requested at the edge POP 112A, the edge POP 112A may extract routing information for origin servers associated with the distribution 'D1' from the maintained origin server routing information (shown above in TABLE 2). The edge POP 112A may further extract information for all mid-tier POPs 114 associated with the distribution 'D1' from maintained mid-tier POP routing information (shown above as TABLE 1). The edge POP 112A may then dynamically create a routing table for the distribution 'D1'. One example of such a routing table is shown below as TABLE 3.

TABLE 3

| D1 Content Source | Network distance (latency) | Allowed cache misses per second |
|---|---|---|
| Origin Server 104A | 155 ms | 100 |
| Origin Server 104C | 225 ms | 300 |
| Mid-tier POP 114A | 25 ms | 800 |
| Mid-tier POP 114C | 60 ms | 2500 |

Utilizing the information of TABLE 3, the edge POP 112A may selectively route requests for content associated with distribution 'D1' to one of the origin server 104A, the origin server 104C, the mid-tier POP 114A, or the mid-tier POP 114C. For example, based on the information above, the edge POP 112 may determine that a first 800 cache misses per second associated with origin server 104A should be routed to mid-tier POP 114A, a next 2500 cache misses per second should be routed to mid-tier POP 114C thereafter, that a next 100 cache misses should be routed to the origin server 104A, and that a next 300 cache misses should be routed to the origin server 104C. In instances where the number of cache misses per second exceeds the total allowed cache misses per second of all content sources, the edge server 112A may attempt to balance the cache misses between potential content sources, or may return an error. Thus, by utilizing the information of TABLE 3, the edge server 112A may selectively route cache misses to various content sources according to the proximity of those sources to the edge server 112A, the load on the content sources, or a combination thereof.

In some embodiments, an edge server 112 may maintain a set of information mapping one or more distributions to potential content sources for that distribution (e.g., one or more origin servers 104 or mid-tier POPs 114), as well as distinct routing information for each potential content source (e.g., origin servers 104 or mid-tier POPs 114). For example, an edge server 112 may maintain a first table correlating or mapping each distribution to one or more potential content sources, a second table indicating routing information for various origin servers 104 (with or without reference to distribution), and a third table indicating routing information for various mid-tier POPs 114 (with or without reference to distribution). On receiving a request for uncached content, the edge server 112 may determine a specific distribution which includes the content (e.g., based on a URI of the requested content), and reference the first table to determine potential sources for the content (e.g., one or more origin servers 104 and/or one or more mid-tier POPs 114). The edge server 112 may then extract routing information for each potential content source from the second and third tables, and dynamically combine this routing information to create a routing table for the distribution. The edge server 112 can thereafter utilize the routing table to retrieve the uncached content from a preferred content source.

While shown as an ordered series of operations, various interactions of FIG. 3 may occur at various different times, or may occur simultaneously. Illustratively, the edge POP 112A may function to continuously update its routing information based on communications to the mid-tier POPs 114 and origin servers 104, such that the routing information is repeatedly revised during operation of the edge POP 112. Furthermore, where no exchange of information occurs between the edge POP 112A and an individual mid-tier POP 114 or origin server 104, the edge server 112A may generate routing information for that mid-tier POP 114 or origin server 104 based on estimated metrics, such as an estimated geographic distance between the edge POP 112A and the individual mid-tier POP 114 or origin server 104.

Further, while the interactions of FIG. 3 are shown as occurring at an edge POP 112, similar interactions may additionally or alternatively be carried out by mid-tier POPs 114. For example, each mid-tier POP 114 may actively or passively monitor a network connection with various origin servers 104 to determine network distances between the mid-tier POP 114 and the origin servers 104. In some instances, this information may be transmitted to the POP manager 116 for use in assigning mid-tier POPs 114 to various origin servers 104.

Figure 4:
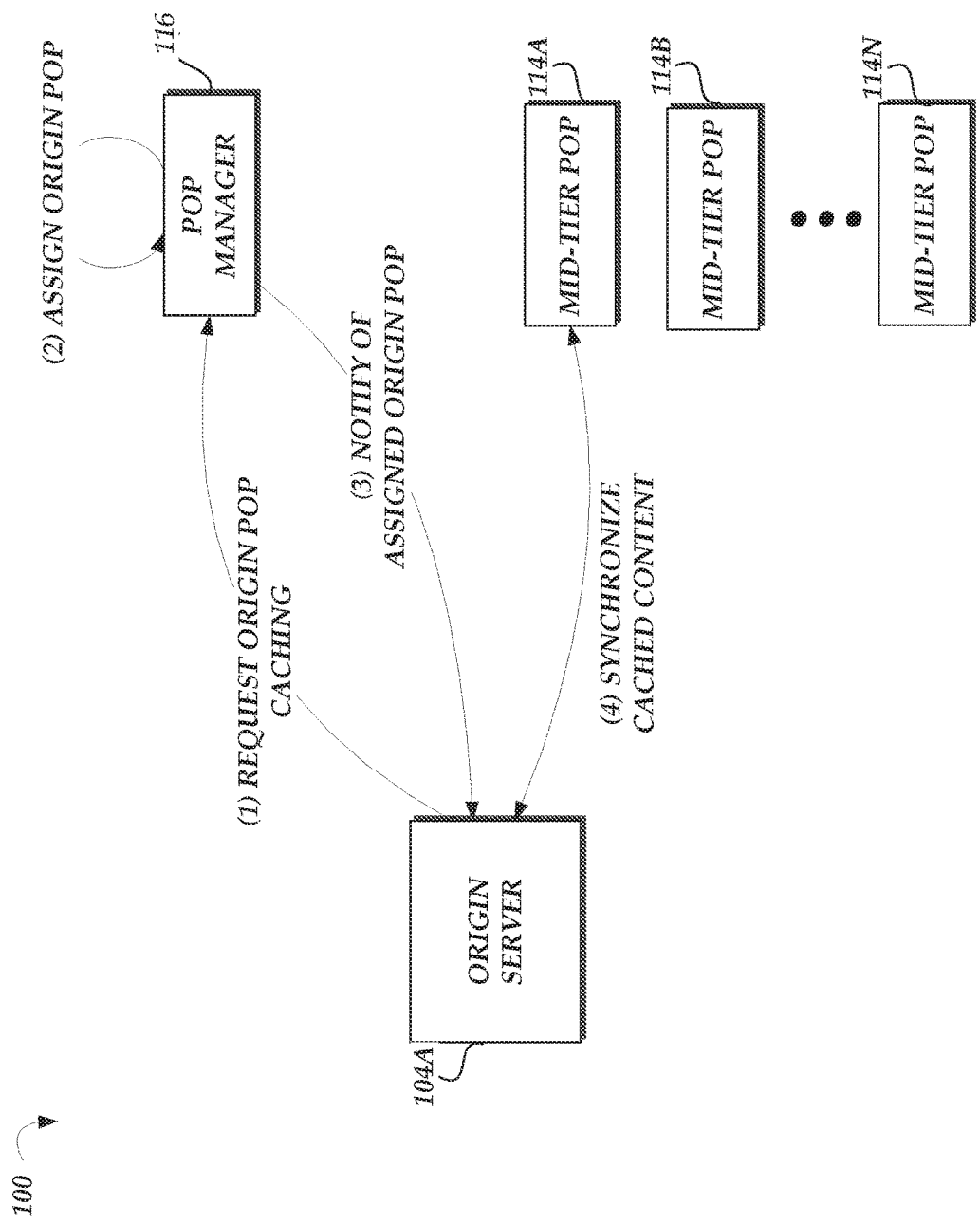
FIG. 4 is a block diagram depicting interactions between a content provider and other components of FIG. 1 to assign a mid-tier POP, within the CDN, to content associated with an origin server.

With reference to FIG. 4, a set of illustrative interactions are depicted for assigning a mid-tier POP 114 to a distribution of content associated with an origin server 104A, in accordance with aspects of the present disclosure. The interactions begin at (1), where an origin server 104A associated with a specific distribution of content, submits a request to utilize mid-tier POP caching on the CDN 110. While the request, in FIG. 4, is illustrative shown as originating from the origin server 104A, the request may be transmitted to the CDN 110 by any computing device associated with the distribution of content, such as a computing device (not shown in FIG. 4) of an administrator or operator of the origin server 104A. The request is illustratively routed, within the CDN 110, to the POP manager 116. At (2), the POP manager 116 assigns a mid-tier POP 114 to the distribution based at least partly on a proximity between the mid-tier POP 114 and the origin server 104A. In one embodiment, the POP manager 116 may utilize network distance information gathered by the mid-tier POPs 114A to determine a specific mid-tier POP 114 that is proximate to the origin server 104A. In another embodiment, the POP manager 116 estimates distances between the mid-tier POPs 114 and the origin server 104A (e.g., using network address geolocation techniques, which are known within the art, and utilize a database of information mapping network addresses to specific geographic locations) to determine a specific mid-tier POP 114 that is proximate to the origin server 104A. In some instances, the POP manager 116 may utilize additional or alternative criteria to assign a mid-tier POP 114 to the distribution. For example, the POP manager 116A may utilize capacity information of the various mid-tier POPs 114 (e.g., as monitored based on operation of the mid-tier POPs 114, inferred based on the number of origin servers 104 associated with each mid-tier POP 114, etc.) to determine a closest mid-tier POP 114A to the origin server 104A that has capacity to be assigned to the distribution provided by the origin server 104A. For the purposes of FIG. 4, it will be assumed that the POP manager 116 assigns mid-tier POP 114A to maintain a distribution associated with the origin server 104A.

At (3), the POP manager 116 notifies the origin server 104A of the assigned mid-tier POP 114A. For example, POP manager 116 may return a network identifier of the mid-tier POP 114A, such as an internet protocol ("IP") address or uniform resource identifier ("URI"), to the origin server 104A. Thereafter, at (4), the origin server 104A and the assigned mid-tier POP 114A may communicate in order to synchronize content of a distribution associated with the origin server 104A. In one embodiment, this synchronization may occur independently from other operations of the origin server 104A, such that the origin server 104A provides the mid-tier POP 114A an initial set of content to be cached. In other embodiments, the synchronization may occur during normal operation of the origin server 104A and the mid-tier POP 114A (e.g., in response to cache misses occurring at the mid-tier POP 114A subsequent to assignment to the origin server 104A).

Figure 5:
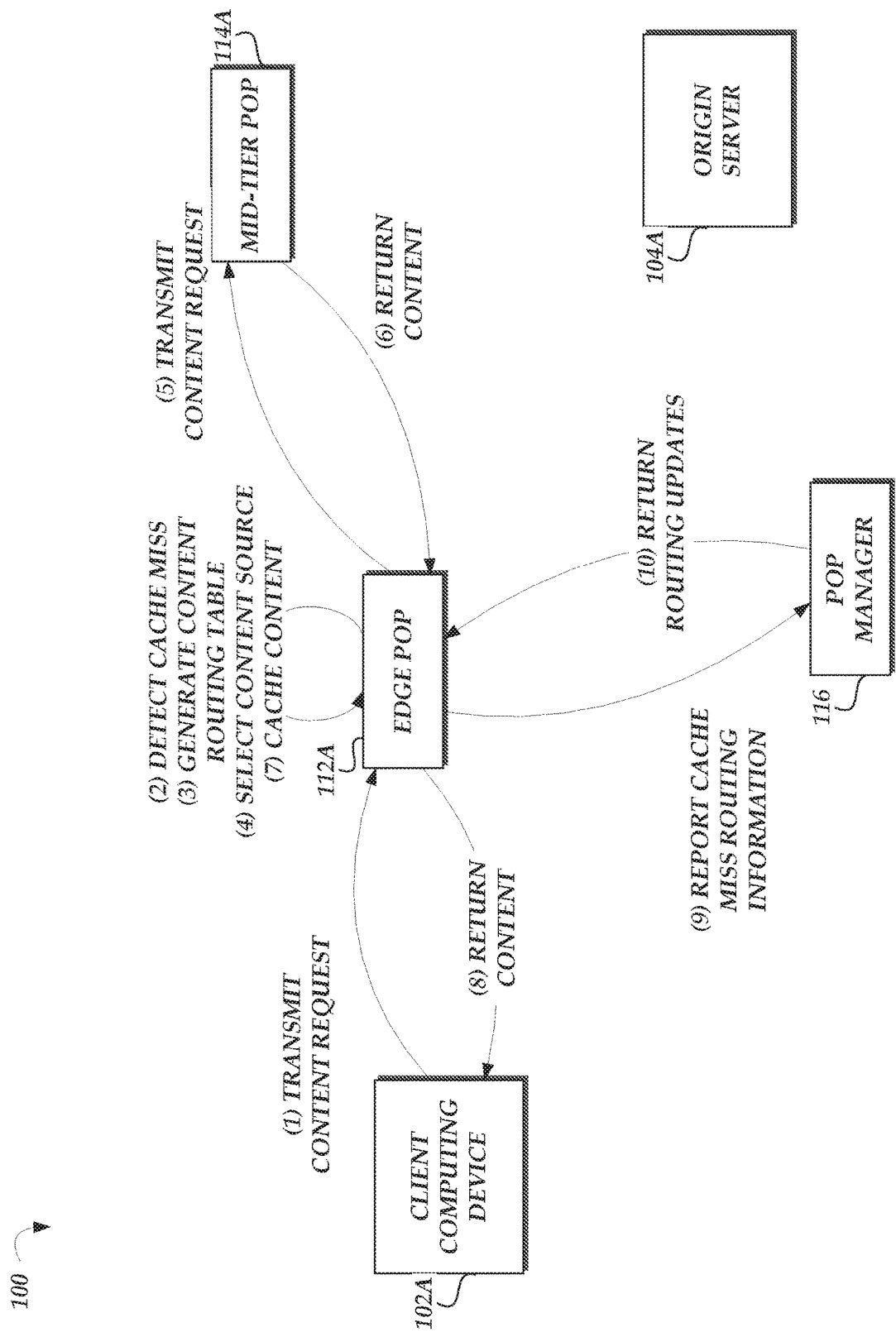
FIG. 5 is a block diagram depicting interactions for routing a client request, at an edge POP within the CDN of FIG. 1, for content that is not maintained at the edge POP.

With reference to FIG. 5, an illustrative set of interactions are depicted for utilizing a mid-tier POP 114A to process cache misses at an edge POP 112A without requiring interaction with an origin server 104A associated with the uncached content. The interactions of FIG. 5 begin at (1), where a client computing device 102A transmits a request for content to the edge POP 112A. As noted above, various algorithms and mechanisms for distribution of request from client computing devices 102 to edge POPs 112 are known in the art, and thus will not be described in detail herein.

Thereafter, at (2), the edge POP 112 detects that the requested content is not cached at the edge POP 112A (e.g., that a cache miss has occurred). To determine a content source from which to request the uncached content, the edge POP 112, at (3), generates a content routing table. One example of such a content routing table is shown above, as TABLE 3. As discussed above, the content routing table may be dynamically generated utilizing routing information for maintained at the edge POP 112A for a plurality of origin servers, as well as routing information for a plurality of mid-tier POPs 114A. Accordingly, the content routing table may reflect a variety of potential content sources for the uncached information, as well as information enabling the edge POP 112A to determine which content source to request the content from (e.g., network distance information, capacity information, etc.).

At (4), the edge POP 112A selects a content source from the generated content routing table. In the interactions of FIG. 5, it will be assumed that the edge POP 112A has selected mid-tier POP 114A. However, selection of other content sources, including the origin server 104A serving as a primary source for the content, are possible.

Thereafter, at (5), the edge POP 112A transmits a request for the uncached content to the mid-tier POP 114A. The mid-tier POP 114A, in turn, retrieves the content from its own cache, and returns the content to the edge POP 112, at (6). The content can then be cached at the edge POP 112A, at (7), and returned to the client computing device 102A, at (8). Thus, even in the instance of a cache miss at an edge server 112A, the client computing device 102A can be provided with requested content without interaction with the origin server 104A, and at a higher speed than such content would likely be provided if interaction with the origin server 104A were to occur.

In some instances, the edge POP 112A may communicate with the POP manager 116 to exchange information regarding processing of cache misses. For example, the edge POP 112A may, at (9), notify the POP manager 116 of each cache miss (e.g., immediately after a cache miss, or periodically). The POP manager 116, in turn, may generate new routing information, such as new capacity information for a content source utilized to process the cache miss, and return that new routing information to the edge POP 112A, at (10). Illustratively, such communication may enable the edge POP 112A to maintain real time availability information for the various content sources (e.g., mid-tier POPs 114 and origin servers 104) to ensure such content sources are not overwhelmed with content requests.

One of skill in the art will appreciate that FIG. 5 may include various additional or alternative interactions than are described above. For example, it is assumed for the purposes of FIG. 5 that the mid-tier POP 114A contains a version of the content requested by the client computing device 102A. However, in instances where the mid-tier POP 114A does not contain the requested information, the mid-tier POP 114A may communicate with the origin server 104A to retrieve the requested information before returning such information to the edge POP 112A. Further, in instances where a content source (such as the mid-tier POP 114A) fails to timely respond to requests from the edge POP 112a (e.g., within a threshold period of time), the edge POP 112A may request the content from an alternative content source, such as the origin server 104A. Thus, the interactions of FIG. 5 are intended to be illustrative in nature.

Figure 6:
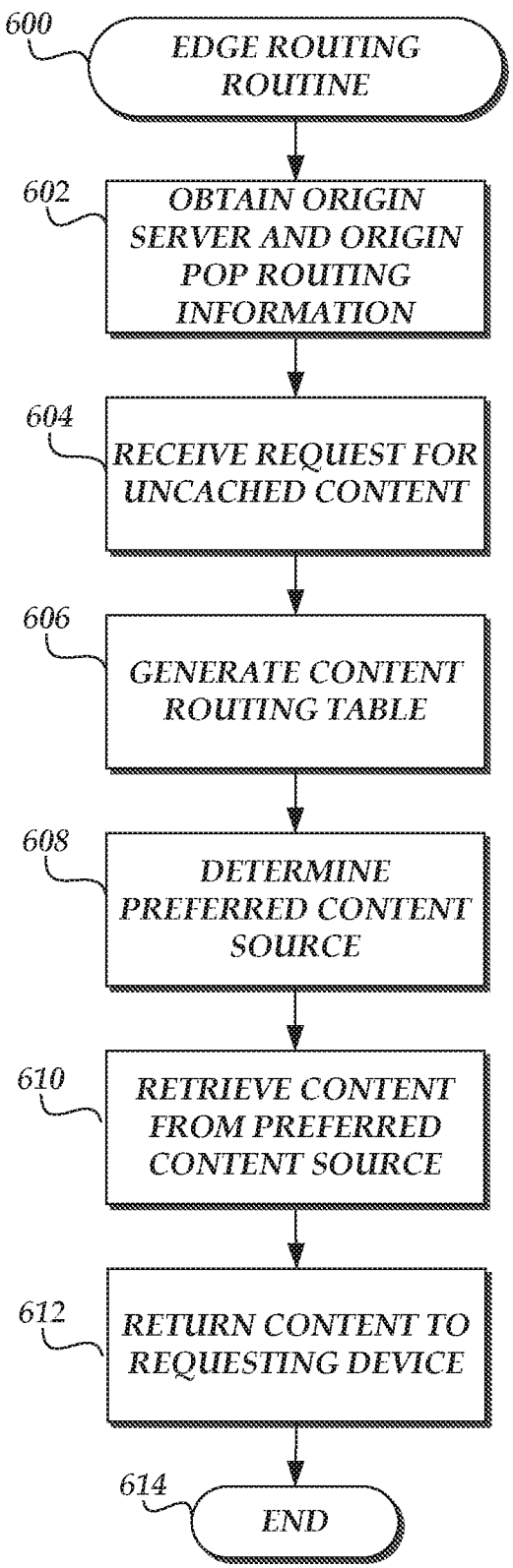
FIG. 6 is a flow chart depicting an illustrative routine for routing client requests, at an edge POP within the CDN of FIG. 1, for content that is not maintained at the edge POP.

With reference to FIG. 6, one illustrative routine 600 for routing of requests for uncached content at an edge POP, such as an edge POP 112 of FIG. 1, is described. The routine 600 begins at block 602, where the edge POP obtains routing information corresponding to the origin servers and mid-tier POPs associated with the CDN. In one embodiment, the routing information may be generated at the edge POP itself, based on active or passive monitoring of network paths between the edge POP and the respective origin servers and mid-tier POPs. In another embodiment, the routing information is received at least from other components of the CDN, such as a POP manager. Illustrative representations of the routing information are shown above as TABLES 1 and 2.

At block 604, the edge POP receives a request from a client computing device for content not cached or maintained at the edge POP. Illustratively, the request may correspond to a request for content that is not frequently requested at the edge POP, and that therefore has been evicted from (or has never existed within) a cache of the edge POP. Thus, in order to service the request, the edge POP may determine that the content should be retrieved from an external content source.

To determine a content source from which to request the uncached content, the edge POP, at block 606, generates a routing table for the content based on the obtained routing information for mid-tier POPs and origin sources. Specifically, the edge POP may determine at a set of potential content sources associated with the requested information (e.g., based on a URL or other identifier of the information provided by a request client computing device). The edge POP may further extract routing information from each potential content source from the obtained origin server and origin routing information. The edge POP can thereafter combine the routing information into a content source routing table. One example of such a routing table is shown above as TABLE 3.

Thereafter, at block 608, the edge POP determines a preferred content source utilizing the content source routing table. A preferred content source may be based on any individual metric within the content routing table, such as a network distance to each potential content source, or on a combination of metrics, such as a combination of network distance to each potential content source and current load on each potential content source. For example, the edge POP may be configured to utilize the nearest potential content source (e.g., in terms of network distance), so long as the load on that content source does not exceed a threshold amount.

At block 610, the edge POP can retrieve the content from the preferred content source (e.g., an origin server of the content or a mid-tier POP assigned to the origin server). While not shown in FIG. 6, if the preferred content source fails to return the content in a threshold period of time, the edge POP may attempt to retrieve the content from a less preferred content source (e.g., the 2nd preferred content source) until the content source is retrieved or potential content sources are exhausted (resulting in an error).

In the instance that the content is retrieved, the routine 600 proceeds to block 612, where the content is returned to the requesting computing device. While not shown in FIG. 6, the edge POP may further place the content within its local cache, such that subsequent requests for the content may be serviced from that local cache.

Thus, by utilization of the routine 600, an edge POP may selectively retrieve uncached content from either origin servers for the content or mid-tier POPs assigned to cache that content. In this manner, edge POPs may utilize mid-tier POPs as second-tier caches for content only when such use is expected to increase the performance of the CDN (e.g., by reducing the time required to provide content, reducing the load on origin servers, or both).

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising a point of presence ("POP") associated with a content delivery network, the POP comprising:
    a data store implementing a cache of content, wherein the content is associated with first and second content sources that act as potential sources from which the POP may retrieve the content; and
    one or more computing devices in communication with the data store, the one or more computing devices configured with computer-executable instructions that, when executed, cause the one or more computing devices to:
        receive, from a requesting device distinct from the POP, the first content source and the second content source, a request for content that is not included within the cache;
        determine, at the POP, a network quality metric between the POP and the first content source for the content and a network quality metric between the POP and the second content source for the content;
        select either the first content source or the second content source as a selected content source for the content that is not included within the cache of the POP based at least in part on i) the network quality metric between the POP and the first content source and the network quality metric between the POP and the second content source and ii) identifying that an allowed cache miss rate for the selected content source has not been exceeded, wherein the allowed cache miss rate indicates a maximum rate of requests for content from the POP to the selected content source;
        retrieve the content from the selected content source; and
        return the content to the requesting device in response to the request.

2. The system of claim 1, wherein the network quality metric comprises at least one of latency, bandwidth, or number of hops.

3. The system of claim 1, wherein the first content source is an additional POP associated with the content delivery network, wherein the system further comprises the additional POP, and wherein the additional POP is configured to:
    receive from the POP a request for the content;
    determine that the content is not included within a cache of the additional POP;
    retrieve the content from an origin server for the content; and
    return the content to the POP in response to the request.

4. The system of claim 3, wherein the additional POP is further configured to select the origin server as a content source of the additional POP based at least in part on a comparison of a network quality metric between the additional POP and the origin server and a network quality metric between the additional POP and a third POP of the content delivery network.

5. The system of claim 1, wherein the instructions further cause the one or more computing devices to determine the network quality metric between the POP and the first content source at least partly by transmitting a network probe to the first content source.

6. The system of claim 1, wherein the instructions further cause the one or more computing devices to determine the network quality metric between the POP and the first content source at least partly by estimating network quality metric based at least in part on monitoring communications between the POP and at least one of the first content source or an additional computing device associated with the first content source.

7. A method implemented at a point of presence ("POP") associated with a content delivery network, wherein the POP includes a cache of content, the content associated with first and second content sources that act as potential sources from which the POP may retrieve the content, and wherein the method comprises:

receiving, from a requesting device distinct from the POP, the first content source and the second content source, a request for content that is not included within the cache;

determining, at the POP, a network quality metric between the POP and the first content source for the content and a network quality metric between the POP and the second content source for the content;

selecting either the first content source or the second content source as a selected content source for the content that is not included within the cache of the POP based at least in part on i) the network quality metric between the POP and the first content source and the network quality metric between the POP and the second content source and ii) identifying that an allowed cache miss rate for the selected content source has not been exceeded, wherein the allowed cache miss rate indicates a maximum rate of requests for content from the POP to the selected content source;

retrieving the content from the selected content source; and returning the content to the requesting device in response to the request.

8. The method of claim 7, wherein at least one of the first content source or the second content source is an origin server acting as a primary source for the content.

9. The method of claim 7 further comprising:
receiving a subsequent request for content;
determining that the content is not included within the cache;
determining that a load on the first content source exceeds a threshold;
responsive to determining that the load on the first content source exceeds the threshold, retrieving the requested content from the second content source; and
returning the content in response to the subsequent request.

10. The method of claim 9, wherein the load is measured in requests per second transmitted from the POP to the first content source.

11. The method of claim 7, wherein determining the network quality metric between the POP and the first content source comprises transmitting a network probe to the first content source.

12. The method of claim 7, wherein determining the network quality metric between the POP and the first content source comprises estimating network quality metric based at least in part on monitoring communications between the POP and at least one of the first content source or an additional computing device associated with the first content source.

13. Non-transitory computer-readable media comprising computer-executable instructions that, when executed by a point of presence ("POP") including a cache of content and associated with a content delivery network, the content being associated with first and second content sources that act as potential sources from which the POP may retrieve the content, causes the POP to:

receive, from a requesting device distinct from the POP, the first content source and the second content source, a request for content that is not included within the cache;

determine, at the POP, a network quality metric between the POP and the first content source for the content and a network quality metric between the POP and the second content source for the content;

select either the first content source or the second content source as a selected content source for the content that is not included within the cache of the POP based at least in part on the network quality metric between the POP and the first content source and the network quality metric between the POP and the second content source and ii) identifying that an allowed cache miss rate for the selected content source has not been exceeded, wherein the allowed cache miss rate indicates a maximum rate of requests for content from the POP to the selected content source;

retrieve the requested content from the selected content source; and return the requested content to the requesting device in response to the request.

14. The non-transitory computer-readable media of claim 13, wherein at least one of the first content source or the second content source is an additional POP associated with the content delivery network.

15. The non-transitory computer-readable media of claim 13, wherein the instructions cause the POP to determine the network quality metric between the POP and the first content source at least partly by transmitting a network probe to the first content source.

16. The non-transitory computer-readable media of claim 13, wherein the instructions cause the POP to determine the network quality metric between the POP and the first content source at least partly by monitoring communications between the POP and at least one of the first content source or an additional computing device associated with the first content source.

17. The non-transitory computer-readable media of claim 13, wherein the instructions cause the POP to select either the first content source or the second content source as the selected content source further based at least partly on determining that a load for the selected content source does not exceed a threshold.

18. The non-transitory computer-readable media of claim 13, wherein the POP is in communication with the first content source via a private network, wherein the POP is in communication with the second content source at least partly via a public network, and wherein the network quality metrics between the POP and the respective content sources are reflective of whether communications between the POP and the respective content sources occur over the private network or the public network.

19. The non-transitory computer-readable media of claim 13, wherein the network quality metric between the POP and the first content source is estimated based at least partly on a geographic distance between the POP and the first content source.

* * * * *

UNITED STATES PATENT AND TRADEMARK OFFICE
CERTIFICATE OF CORRECTION

PATENT NO. : 11,134,134 B2  
APPLICATION NO. : 16/361012  
DATED : September 28, 2021  
INVENTOR(S) : Hardeep Singh Uppal et al.

Page 1 of 1

It is certified that error appears in the above-identified patent and that said Letters Patent is hereby corrected as shown below:

On the Title Page

Column 2, Item (57), Line 12, under ABSTRACT, delete "origin facing" and insert --origin-facing--.

On Page 13, Column 2, Item (56), Line 16, under Other Publications, delete "6010099 70," and insert --601009970,--.

On Page 13, Column 2, Item (56), Line 34, under Other Publications, delete "UltraSP ARC" and insert --UltraSPARC--.

On Page 14, Column 1, Item (56), Line 10, under Other Publications, delete "(URL:" and insert --URL:--.

On Page 16, Column 2, Item (56), Line 27, under Other Publications, delete "PCT/US/2016/" and insert --PCT/US2016/--.

On Page 16, Column 2, Item (56), Line 29, under Other Publications, delete "PCT/US/2016/" and insert --PCT/US2016/--.

On Page 16, Column 2, Item (56), Line 54, under Other Publications, delete "Applicaton" and insert --Application--.

In the Specification

In Column 11, Line 44, delete "POPPOP" and insert --POP--.

In the Claims

In Column 20, Claim 13, Line 12, after "on" insert --i)--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*